United States Patent
Yamashita

(10) Patent No.: US 8,012,004 B2
(45) Date of Patent: Sep. 6, 2011

(54) COMPUTER-READABLE STORAGE MEDIUM HAVING GAME PROGRAM STORED THEREON AND GAME APPARATUS

(75) Inventor: Yoshikazu Yamashita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 617 days.

(21) Appl. No.: 11/645,633

(22) Filed: Dec. 27, 2006

(65) Prior Publication Data

US 2008/0119285 A1 May 22, 2008

(30) Foreign Application Priority Data

Nov. 16, 2006 (JP) ................... 2006-310617

(51) Int. Cl.
*A63F 13/00* (2006.01)
(52) U.S. Cl. .......... 463/4; 463/1; 463/2; 463/3
(58) Field of Classification Search ............... 463/31, 463/1–4
See application file for complete search history.

(56) References Cited

U.S. PATENT DOCUMENTS 6,478,678 B1 * 11/2002 Rimoto et al. .................. 463/31

FOREIGN PATENT DOCUMENTS

JP 2001-137554 5/2001

OTHER PUBLICATIONS

Ken Griffey Jr. Baseball Review, Gamespot, Jun. 11, 1998.*
All-Star Baseball '99 Review for Nintendo 64. Ryan Mac Donald, May 25, 1998 http://www.gamespot.com/n64/sports/allstarbaseball99/review.html.*
All-Star Baseball '99 gameplay video. N64guide.com http://www.youtube.com/watch?v=-Vwh0yySY4A.*
High Heat Major League Baseball 2003 Review for PS2 Shane Satterfield, Game Spot, Feb. 28, 2002 http://www.gamespot.com/ps2/sports/highheatmajorleagueb2003/index.html.*
MVP Baseball 2004 review IGN, Mar. 11, 2004 http://pc.ign.com/articles/498/498131p1.html.*

* cited by examiner

*Primary Examiner* — Peter DungBa Vo
*Assistant Examiner* — Jeffrey Wong
(74) *Attorney, Agent, or Firm* — Nixon & Vanderhye P.C.

(57) ABSTRACT

While a ball is rising, a point of attention of a virtual camera is set at the current position of the ball. At the instant when the movement of the ball is changed from rising to falling, the point of attention of the virtual camera is moved from the position of the ball to the position of the shadow of the ball. While the ball is falling, the point of attention of the virtual camera is set at the position of the shadow of the ball. Thus, in a baseball game or the like, a game image capable of providing a realistic feeling to the player and also allowing the player to grasp an area below the ball before the ball drops on the ground can be generated.

30 Claims, 16 Drawing Sheets

COMPUTER-READABLE STORAGE MEDIUM HAVING GAME PROGRAM STORED THEREON AND GAME APPARATUS

CROSS REFERENCE TO RELATED APPLICATION

The disclosure of Japanese Patent Application No. 2006-310617, filed on Nov. 16, 2006, is incorporated herein by reference.

BACKGROUND

1. Field

Present example embodiments of the technology described herein relate to a computer-readable storage medium having a game program stored thereon and a game apparatus, and more specifically to a computer-readable storage medium having a game program stored thereon and a game apparatus for displaying, on a display screen, a game image representing a movable object moving above a field which is set in a virtual three-dimensional space.

2. Description of the Background Art

Conventionally, computer-readable storage mediums having a game program stored thereon and game apparatuses are available for displaying, on a display screen, a game image representing a movable object moving above a field which is set in a virtual three-dimensional space such as, for example, a baseball game or a golf game.

For example, the baseball game called "Jikkyo (Live) Powerful Professional Baseball 12" marketed on Jul. 14, 2005 by Konami Corporation adopts a method for controlling a virtual camera such that, when a batter hits the ball, the virtual camera located up in the sky follows the shadow of the ball. According to such a control method on a virtual camera, an area in the vicinity of the shadow of the ball is continuously displayed on the screen. Thus, the player can watch the motion of fielders running toward the point where the ball is to fall.

Another conventional technology for the baseball game is provided by a game apparatus described in Japanese Laid-Open Publication No. 2001-137554 (hereinafter, referred to as "patent document 1"). This game apparatus adopts a method for control a virtual camera, by which immediately after the batter hits the ball, a fielder who can reach the point where the ball is to fall first is selected, and the virtual camera continuously shoots the ball from behind the fielder until the fielder catches the ball. According to such a control method on the virtual camera, the player can watch the ball from the point of view of the fielder. Thus, a realistic game play is realized.

According to the control method on the virtual camera adopted by "Jikkyo (Live) Powerful Professional Baseball 12", the virtual camera follows the shadow of the ball regardless of the position of the ball. Therefore, when the trajectory of the ball is high above from the ground, the ball may not be displayed on the screen. The player cannot check the ball flying high in the sky on the screen, and cannot enjoy a realistic feeling.

According to the control method on the virtual camera adopted by the game apparatus described in patent document 1, the player can check, on the screen, both the motion of the fielder who can reach the point where the ball is to fall first and the ball flying high in the sky. However, the virtual camera is set so as to shoot an area above the fielder from behind the fielder. Therefore, the player cannot grasp the point right below the ball, the point where the ball is to fall, or the like. Therefore, the player cannot check, on the screen, the motion of the other fielders running toward the point where the ball is to fall, whether the ball is flying outside or inside the foul line, or the like.

SUMMARY

Therefore, an aspect of present example embodiments is to provide a game program and a game apparatus for displaying, on a display screen, a game image representing a movable object moving above a field which is set in a virtual three-dimensional space, which are capable of providing a realistic feeling to a player and also allow the player to grasp an area below the movable object before the movable object reaches the ground.

Present example embodiments have the following features to attain the aspects mentioned above. The reference numerals in parentheses in this section of the specification indicate the correspondence with the example embodiments described later for easier understanding of the present example embodiments, and do not limit the present invention in any way.

A computer-readable storage medium according to the present example embodiments has stored thereon a game program (330) executable by a computer (30) of a game apparatus (5) for displaying, on a display screen, a game image representing a movable object moving above a field which is set in a virtual three-dimensional space. The game program stored on the storage medium causes the computer (30) to execute a movement control step (S34), a condition determination step (S50), a point of attention control step (S52, S56, S58), and an image generation step. The movement control step periodically updates position information (335) representing a position of the movable object in the virtual three-dimensional space, such that the movable object moves generally along a parabola above the field. The condition determination step determines whether or not a velocity (336) of the movable object controlled in the movement control step has fulfilled a specific condition. When the velocity of the movable object has not fulfilled the specific condition, the point of attention control step sets a point of attention of a virtual camera at a current position of the movable object (P1). When the velocity of the movable object has fulfilled the specific condition, the point of attention control step moves the point of attention of the virtual camera from the current position of the movable object toward a specific point on the field (P2, P3). The image generation step generates a game image to be displayed on the display screen by perspective and projection conversion processing based on the point of attention controlled in the point of attention control step using the virtual camera which is set in the virtual three-dimensional space.

In a modification of the present example embodiments, the specific point may be an intersection of a vertical straight line passing through the movable object and the field (P2).

In another modification of the present example embodiments, the specific point may be a point where the movable object is to fall (P3).

In still another modification of the present example embodiments, the specific point may be an intermediate position between an intersection of a vertical straight line passing through the movable object and the field (P2) and a point where the movable object is to fall (P3).

In still another modification of the present example embodiments, the specific condition may be regarding a magnitude of the velocity of the movable object ($\sqrt{(Vx^2+Vy^2+Vz^2)}$) in the virtual three-dimensional space.

In still another modification of the present example embodiments, the specific condition may be that a magnitude of the velocity of the movable object, which has been decreasing, starts increasing. Thus, when the movement of the movable object is changed from rising to falling, the point of attention of the virtual camera can be moved from the current position of the movable object to the specific point on the field.

In still another modification of the present example embodiments, the specific condition may be regarding a direction and/or a magnitude of a gravity-direction component (Vy) of a velocity of the movable object in the virtual three-dimensional space.

In still another modification of the present example embodiments, the specific condition may be that the direction of the gravity-direction component of the velocity of the movable object is inverted. Thus, when the movement of the movable object is changed from rising to falling, the point of attention of the virtual camera can be moved from the current position of the movable object to the specific point on the field.

In still another modification of the present example embodiments, in the point of attention control step, when the velocity of the movable object has fulfilled a specific condition, the point of attention of the virtual camera may be repeatedly updated so as to be gradually away from the current position of the movable object and closer to the specific point (S58).

In still another modification of the present example embodiments, in the point of attention control step, the point of attention of the virtual camera may be repeatedly updated so as to be gradually closer to the specific point at a speed in accordance with a distance between a current point of attention and the specific point.

In still another modification of the present example embodiments, in the point of attention control step, the point of attention of the virtual camera may be repeatedly updated so as to be gradually closer to the specific point at a constant speed.

A game apparatus (5) according to the present example embodiments is for displaying, on a display screen, a game image representing a movable object moving above a field which is set in a virtual three-dimensional space. The game apparatus comprises movement control means (30, S34), condition determination means (30, S50) point of attention control means (30, S52, S56, S58), and image generation means (30, 32).

According to the present example embodiments, as a game image which represents a movable object moving above a field set in a virtual three-dimensional space and is to be displayed on the display screen, a game image capable of providing a realistic feeling to the player and also allowing the player to grasp an area below the ball before the ball drops on the ground can be generated.

These and other features, aspects and advantages of the present example embodiments will become more apparent from the following detailed description of the present example embodiments when taken in conjunction with the accompanying drawings.

DESCRIPTION OF THE NON-LIMITING EXAMPLE EMBODIMENTS

Figure 1:
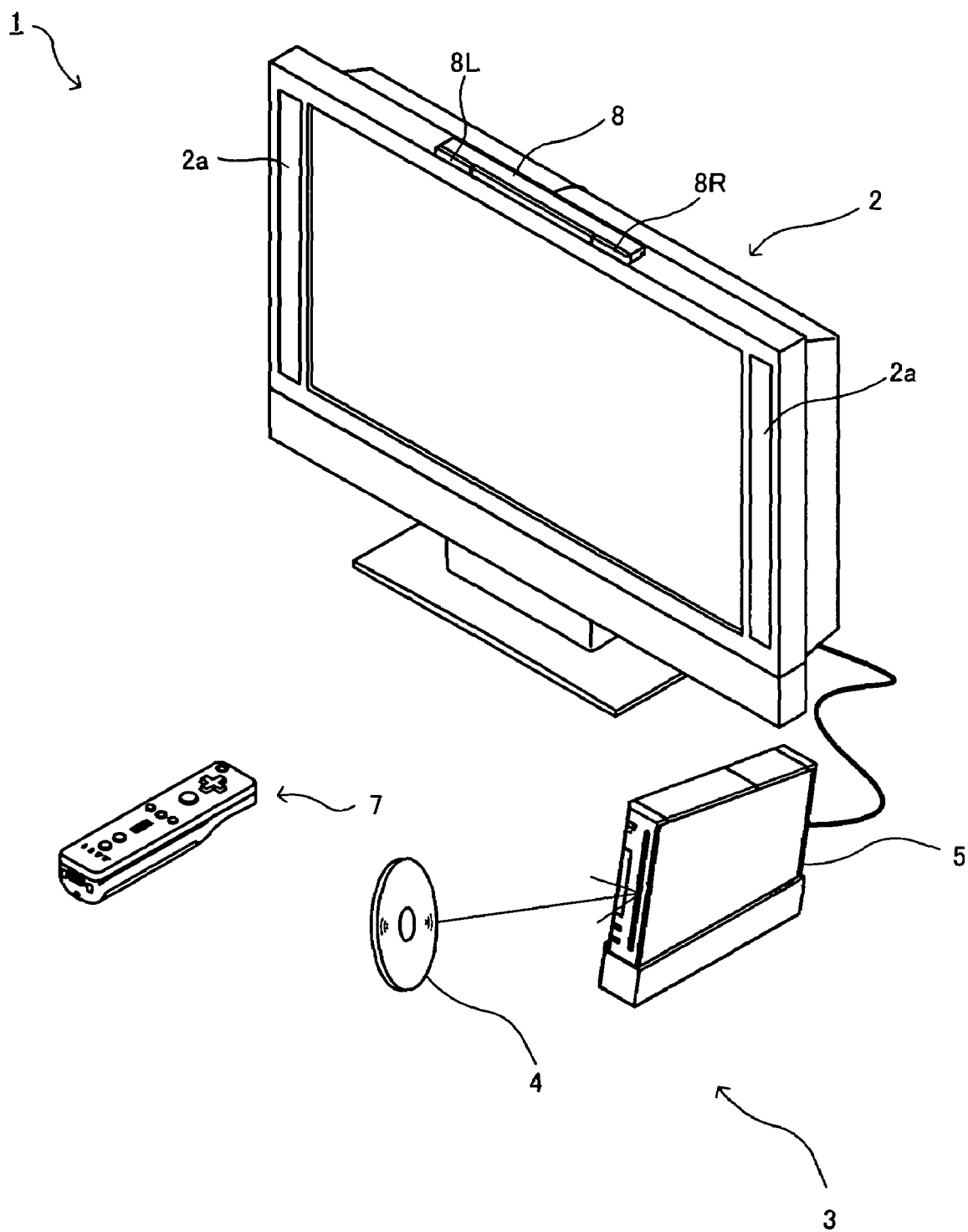
FIG. 1 is an external view of a game system 1 according to a present example embodiment.
Figure 2:
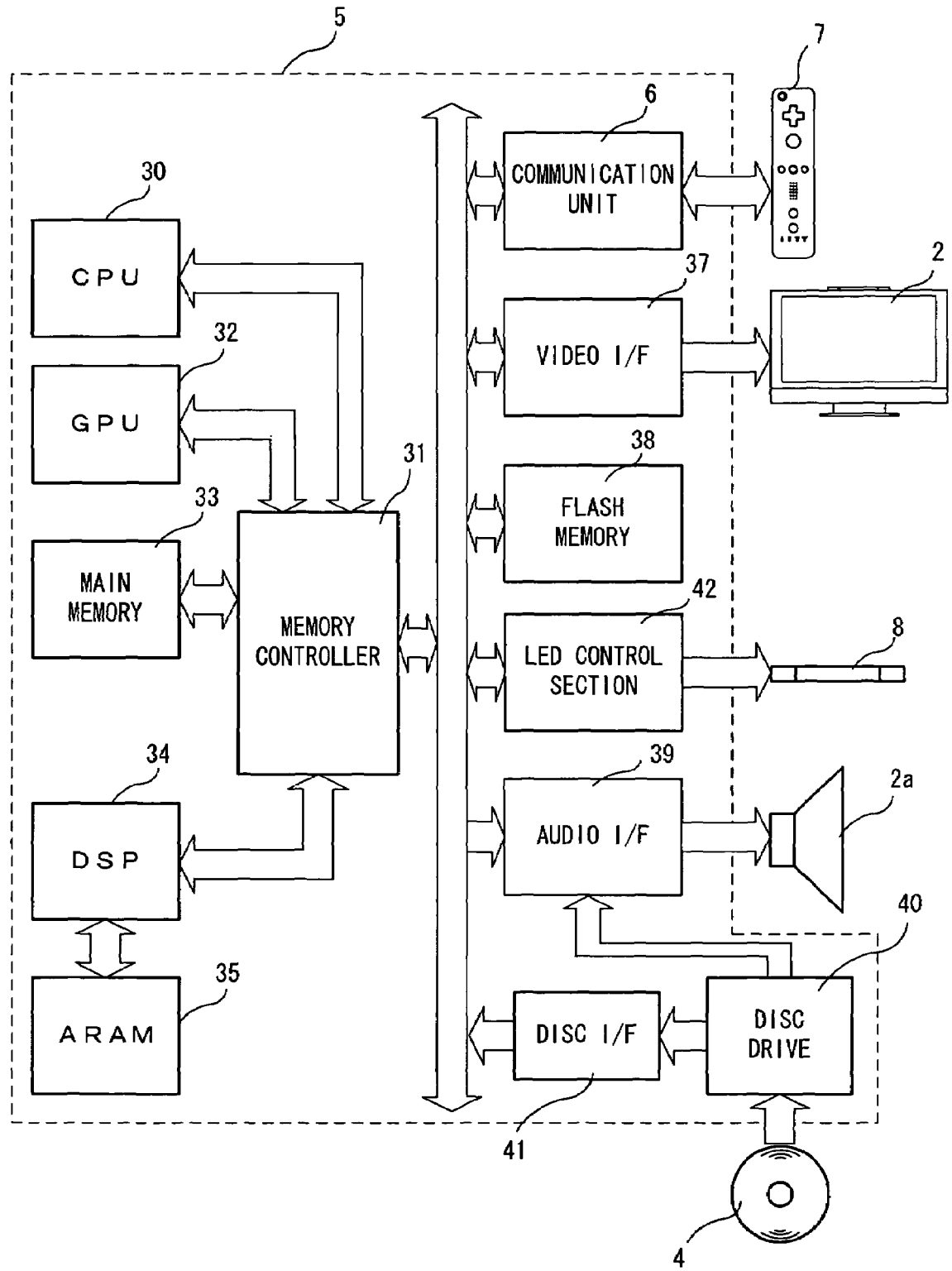
FIG. 2 is a block diagram of a game apparatus main body 5.

With reference to FIG. 1, a game apparatus according to one present example embodiment will be described. In order to give a specific description, a game system 1 including an installation type game apparatus as an exemplary game apparatus according to the present example embodiment will be described. FIG. 1 is an external view of the game system 1 including an installation type game apparatus 3. FIG. 2 is a block diagram of a game apparatus main body 5. Hereinafter, the game system 1 will be described.

As shown in FIG. 1, the game system 1 includes a home-use TV receiver (hereinafter, referred to as a "monitor") 2 as an example of display means and the installation type game apparatus 3 connected to the monitor 2 via a connection cord. The monitor 2 includes speakers 2a for outputting an audio signal which is output from the game apparatus main body 5. The game apparatus 3 includes an optical disc 4 having stored thereon a game program as an exemplary information processing program according to the present example embodiment, the game apparatus main body 5 having a computer mounted thereon for executing the game program stored on the optical disc 4 and causing the monitor 2 to display a game screen, and a controller 7 for providing the game apparatus main body 5 with operation information required to play a game, for example, images of characters displayed on the game screen.

The game apparatus main body 5 has a built-in communication unit 6 (FIG. 2). The communication unit 6 receives data which is wirelessly transmitted from the controller 7, and transmits data from the game apparatus main body 5 to the controller 7. The controller 7 and the game apparatus main body 5 communicate each other wirelessly. On the game apparatus main body 5, the optical disc 4 as an exemplary exchangeable information storage medium is detachably mounted. The game apparatus main body 5 has, on a front main surface thereof, a power ON/OFF switch, a game processing reset switch, an opening for mounting the optical disc 4, an eject switch for removing the optical disc 4 from the opening, and the like.

On the game apparatus main body 5, a flash memory 38 (FIG. 2) is mounted, which acts as a backup memory for fixedly storing saved data or the like. The game apparatus main body 5 executes a game program or the like stored on the optical disc 4 and displays the result on the monitor 2 as a game object. The game apparatus main body 5 can also reproduce a state of a game played in the past using saved data stored on the flash memory 38 and display a game image on the monitor 2. A player playing with the game apparatus main body 5 can enjoy the game by operating the controller 7 while watching the game image displayed on the monitor 2.

The controller 7 wirelessly transmits transmission data such as operation information or the like to the game apparatus main body 5 having the built-in communication unit 6, using the technology of Bluetooth (registered trademark) or the like. The controller 7 is operation means for mainly operating a player character or the like appearing in a game space displayed on a display screen of the monitor 2. The controller 7 includes a housing which is small enough to be held by one hand, and a plurality of operation buttons (including a cross key, a stick and the like) exposed on a surface of the housing. As described later in detail, the controller 7 also includes an imaging information calculation section 74 (FIG. 4) for taking an image viewed from the controller 7. As an example of an imaging target of the imaging information calculation section 74, two LED modules (hereinafter, referred to as "markers") 8L and 8R are provided in the vicinity of the display screen of the monitor 2. The markers 8L and 8R are provided at both ends of a sensor bar 8, and each output infrared light forward from the monitor 2. The controller 7 can generate a sound or vibration in accordance with the transmission data which is wirelessly transmitted from the communication unit 6 of the game apparatus main body 5 and received by a communication section 75 (FIG. 7) in the controller 7.

As shown in FIG. 2, the game apparatus main body 5 includes, for example, a CPU (central processing unit) 30 for executing various types of programs. The CPU 30 executes a start program stored on a boot ROM (not shown) to, for example, initialize memories including a main memory 33, and then executes a game program stored on the optical disc 4 to perform game processing or the like in accordance with the game program. The CPU 30 is connected to a GPU (Graphics Processing Unit) 32, the main memory 33, a DSP (Digital Signal Processor) 34, an ARAM (Audio RAM) 35 and the like via a memory controller 31. The memory controller 31 is connected to the communication unit 6, a video I/F (interface) 37, the flash memory 38, an audio I/F 39, and a disc I/F 41 via a predetermined bus. The video I/F 37, the audio I/F 39 and the disc I/F 41 are respectively connected to the monitor 2, the speaker 2a and a disc drive 40.

The GPU 32 performs image processing based on an instruction from the CPU 30. The GPU 32 includes, for example, a semiconductor chip for performing calculation processing necessary for displaying 3D graphics. The GPU 32 performs the image processing using a memory dedicated for image processing (not shown) or a part of the storage area of the main memory 33. The GPU 32 generates game image data and a movie to be displayed on the monitor 2 using such memories, and outputs the generated data or movie to the monitor 2 via the memory controller 31 and the video I/F 37 as necessary.

The main memory 33 is a storage area used by the CPU 30, and stores a game program or the like necessary for processing performed by the CPU 30 as necessary. For example, the main memory 33 stores a game program, various types of data or the like read from the optical disc 4 by the CPU 30. The game program, the various types of data or the like stored on the main memory 33 are executed by the CPU 30.

The DSP 34 processes sound data or the like generated by the CPU 30 during the execution of the game program. The DSP 34 is connected to the ARAM 35 for storing the sound data or the like. The ARAM 35 is used when the DSP 34 performs predetermined processing (e.g., storage of the game program or sound data already read). The DSP 34 reads the sound data stored on the ARAM 35 and outputs the sound data to the speaker 2a included in the monitor 2 via the memory controller 31 and the audio I/F 39.

The memory controller 31 comprehensively controls data transfer, and is connected to the various I/Fs described above. As described above, the communication unit 6 receives transmission data from the controller 7 and outputs the transmission data to the CPU 30. The communication unit 6 also transmits transmission data which is output from the CPU 30 to the communication section 75 of the controller 7. The video I/F 37 is connected to the monitor 2. The audio I/F 39 is connected to the speaker 2a built in the monitor 2, such that the sound data read by the DSP 34 from the ARAM 35 or sound data directly output from the disc drive 40 is output through the speaker 2a. The disc I/F 41 is connected to the disc drive 40. The disc drive 40 reads data stored at a predetermined reading position of the optical disc 4 and outputs the data to a bus of the game apparatus main body 5 or the audio I/F 39. An LED control section 42 controls light emission of the markers 8L and 8R provided in the sensor bar 8.

Figure 3:
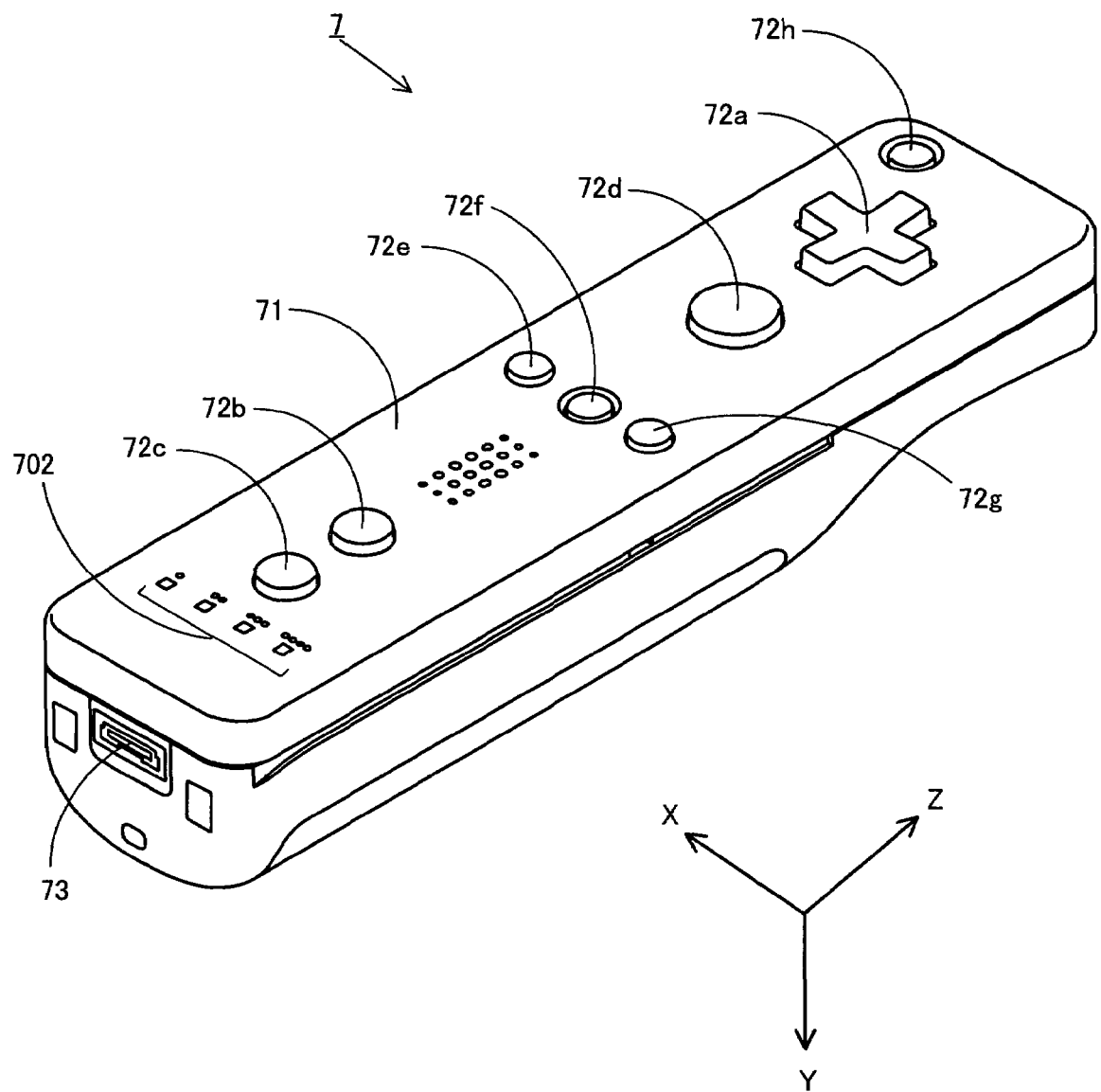
FIG. 3 is an isometric view of a controller 7 seen from the top rear side thereof.
Figure 4:
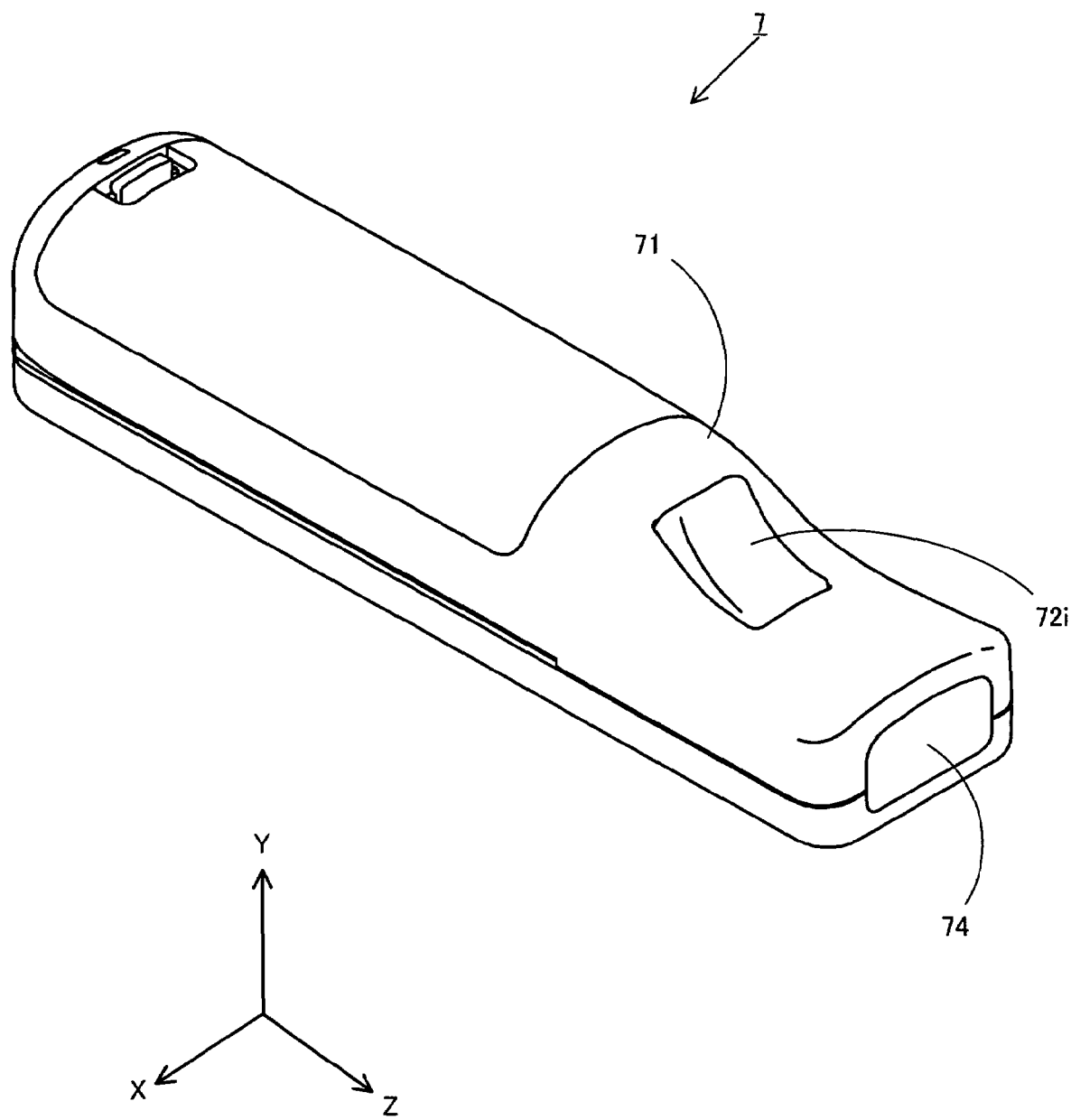
FIG. 4 is an isometric view of the controller 7 seen from the bottom front side thereof.

With reference to FIG. 3 and FIG. 4, the controller 7 will be described. FIG. 3 is an isometric view of the controller 7 seen from the top rear side thereof. FIG. 4 is an isometric view of the controller 7 seen from the bottom front side thereof.

As shown in FIG. 3 and FIG. 4, the controller 7 includes a housing 71 formed by plastic molding or the like. An operation section 72 including a plurality of operation buttons is provided in the housing 71. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes projecting operation portions corresponding to the four directions (front, rear, right and left) and arranged at an interval of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or select one of a plurality of alternatives.

The cross key 72a is an operation section for outputting an operation signal in accordance with the above-described direction input operation performed by the player, but such an operation section may be provided in another form. For example, the operation section may include four push switches provided in a cross arrangement, and output an operation signal in accordance with the push switch which has been pressed by the player. The operation section may further include a center switch provided at the intersection of the cross in addition to the four push switches. Alternatively, the cross key 72a may be replaced with an operation section which includes an inclinable stick (so-called joystick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Rearward to the cross key 72a on the top surface of the housing 71, a plurality of operation buttons 72b through 72g are provided. The operation buttons 72b through 72g are each an operation section for outputting a respective operation signal when the player presses ahead thereof. For example, the operation buttons 72b through 72d are assigned functions of a first button, a second button, and an A button. The operation buttons 72e through 72g are assigned functions of a minus button, a home button and a plus button, for example. The operation buttons 72b through 72g are assigned various functions in accordance with the game program executed by the game apparatus main body 5. In the exemplary arrangement shown in FIG. 3, the operation buttons 72b through 72d are arranged in a line extending in the front-rear direction at the center of the top surface of the housing 71. The operation buttons 72e through 72g are arranged in a line extending in the left-right direction between the operation buttons 72b and 72d. The operation button 72f has a top surface thereof buried in the top surface of the housing 71, so as not to be inadvertently pressed by the player.

Forward to the cross key 72a on the top surface of the housing 71, an operation button 72h is provided. The operation button 72h is a power switch for remote-controlling the power of the game apparatus main body 5 to be on or off. The operation button 72h also has a top surface thereof buried in the top surface of the housing 71, so as not to be inadvertently pressed by the player.

Rearward to the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to the controller 7 that he/she is using. Specifically, when the controller 7 transmits the transmission data to the communication unit 6, one of the plurality of LEDs corresponding to the controller type is lit up.

On the top surface of the housing 71, sound holes for outputting a sound from a speaker (speaker 706 in FIG. 5) described later is provided between the operation button 72b and the operation buttons 72e through 72g.

On a bottom surface of the housing 71, a recessed portion is formed. The recessed portion is formed at a position at which an index finger or middle finger of the player is located when the player holds the controller 7 with one hand in the state where a front surface of the controller 7 is directed toward the markers 8L and 8R. On a slope surface of the recessed portion, an operation button 72i is provided. The operation button 72i is an operation section acting as, for example, a B button.

On the front surface of the housing 71, an imaging element 743 (see FIG. 7) included in the imaging information calculation section 74 is provided. The imaging information calculation section 74 is a system for analyzing image data which is taken by the controller 7, and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. The structure of the imaging information calculation section 74 will be described later in detail. On a rear surface of the housing 71, a connector 73 (FIG. 5) is provided. The connector 73 is, for example, an edge connector, and is used for engaging and connecting the controller 7 with a connection cable.

In order to give a specific description below, a coordinate system which is set for the controller 7 will be defined. As shown in FIG. 3 and FIG. 4, X, Y and Z axes perpendicular to one another are defined for the controller 7. Specifically, the longitudinal direction of the housing 71, i.e., the front-rear direction of the controller 7, is set as the Z axis. A direction toward the front surface of the controller 7 (the surface having the imaging information calculation section 74) is set as a positive Z-axis direction. The up-to-down direction of the controller 7 is set as the Y axis. A direction toward the bottom surface of the controller housing 71 (the surface having the operation button 72i) is set as a positive Y-axis direction. The left-right direction of the controller 7 is set as the X axis. A direction toward a left surface of the housing 71 (the surface which is not shown in FIG. 3 but is shown in FIG. 4) is set as a positive X-axis direction.

Figure 5:
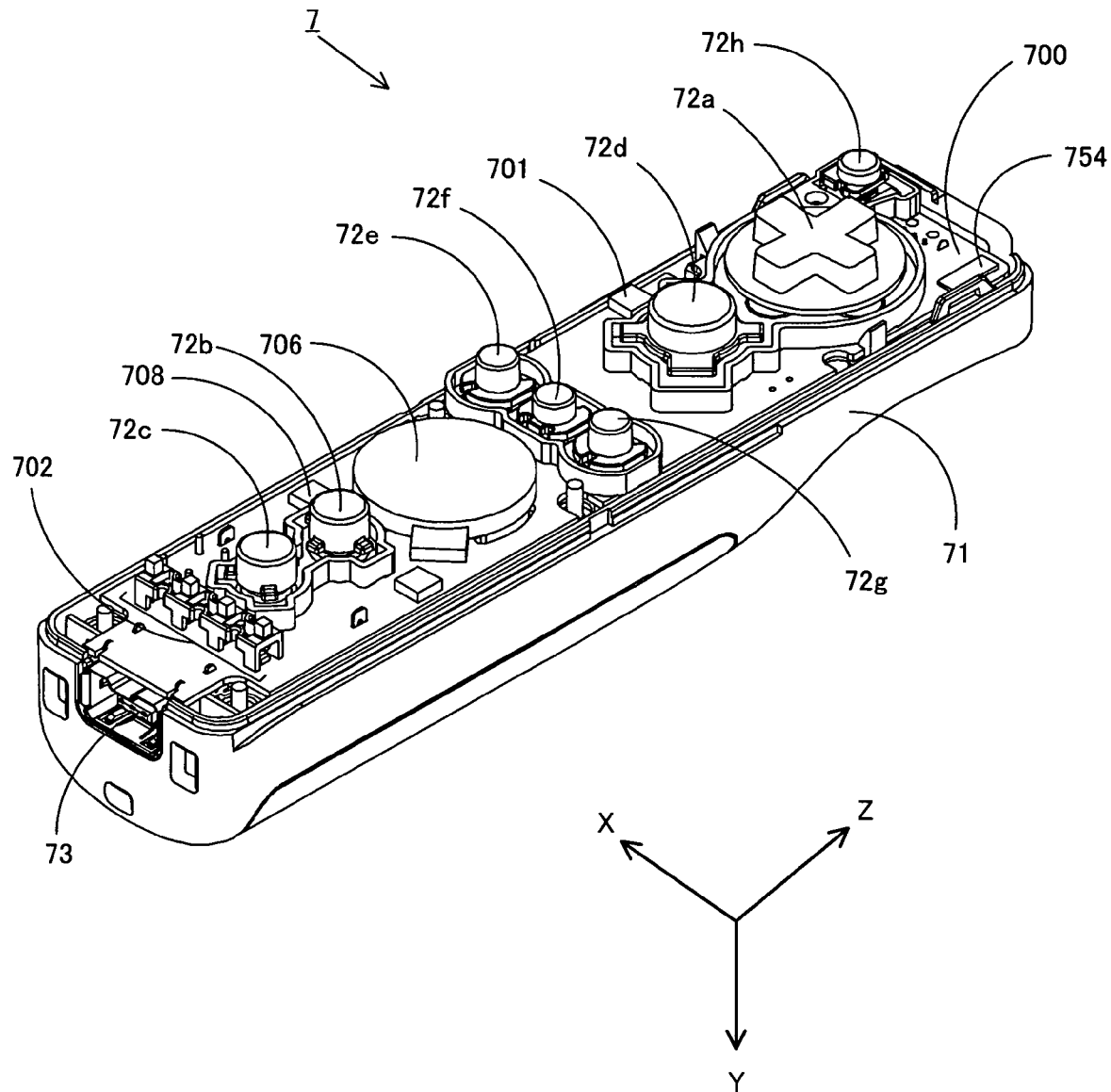
FIG. 5 is an isometric view of the controller 7 in the state where an upper casing is removed.
Figure 6:
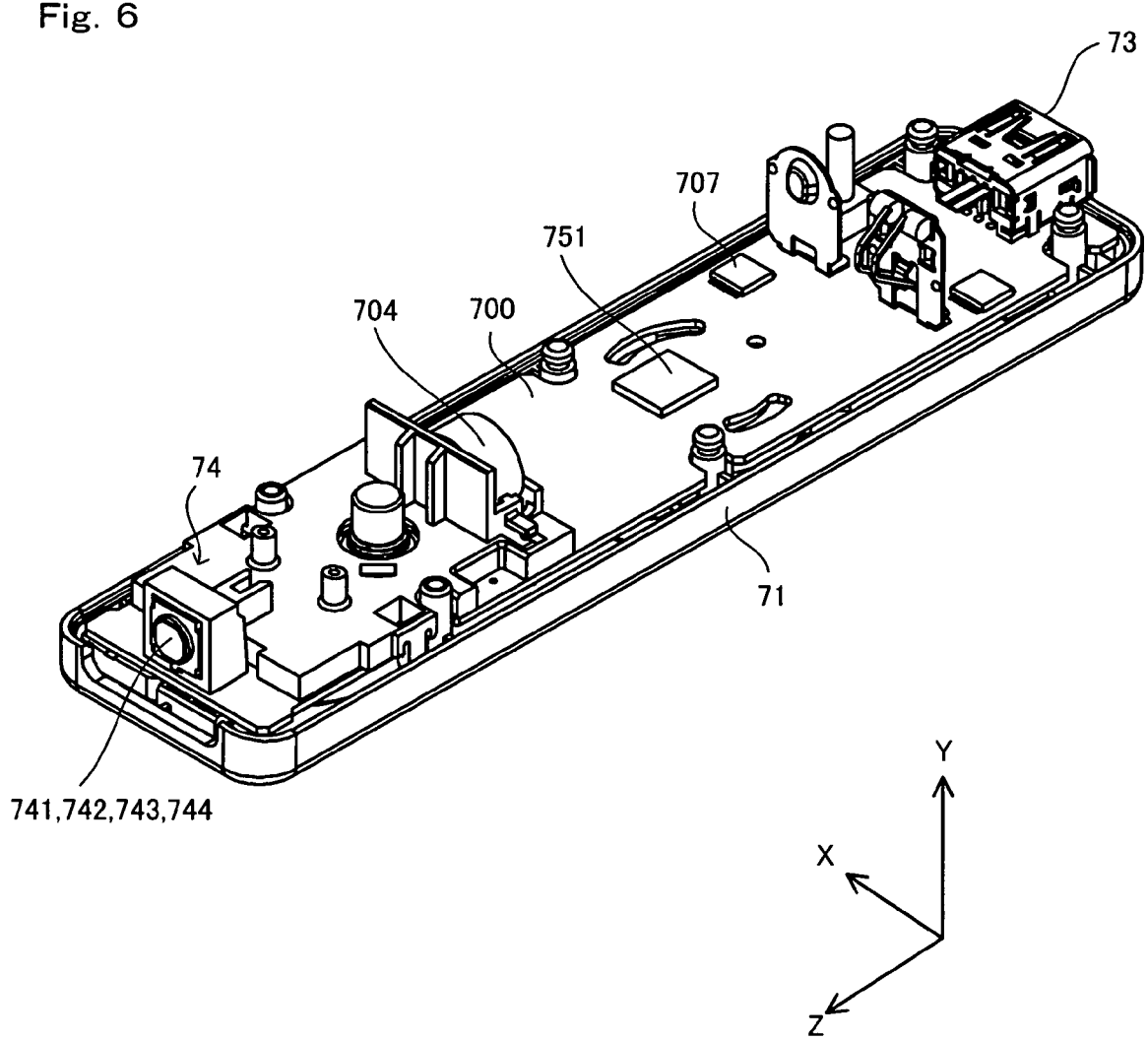
FIG. 6 is an isometric view of the controller 7 in the state where a lower casing is removed.

With reference to FIG. 5 and FIG. 6, an internal structure of the controller 7 will be described. FIG. 5 is an isometric view of the controller 7 seen from the rear side, illustrating a state where an upper casing (a part of the housing 71) of the controller 7 is removed. FIG. 6 is an isometric view of the controller 7 seen from the front side, illustrating a state where a lower casing (a part of the housing 71) of the controller 7 is removed. FIG. 6 shows a reverse side of a substrate 700 shown in FIG. 5.

As shown in FIG. 5, the substrate 700 is fixed inside the housing 71. On a top main surface of the substrate 700, the operation buttons 72a through 72h, an acceleration sensor 701, the LEDs 702, an antenna 754 and the like are provided. These elements are connected to a microcomputer 751 (see FIG. 6 and FIG. 7) or the like via lines (not shown) formed on the substrate 700 or the like. The controller 7 acts as a wireless controller owing to a wireless module 753 (see FIG. 7) and the antenna 754. The housing 71 accommodates a quartz vibrator for generating a reference clock of the microcomputer 751 described later in detail. On the top main surface of the substrate 700, the speaker 706 and an amplifier 708 are provided. The acceleration sensor 701 is provided on the substrate 700 to the left of the operation button 72d (i.e., in a peripheral area of the substrate 700, not in a central area) Owing to such an arrangement, as the controller 7 rotates around the longitudinal direction thereof, the acceleration sensor 701 detects an acceleration including a centrifugal force component in addition to a component of direction change of gravitational acceleration. As a result, the game apparatus main body 5 or the like can determine the rotation of the controller 7 at a high sensitivity based on the detected acceleration through a predetermined calculation.

As shown in FIG. 6, at a front edge of a bottom main surface of the substrate 700, the image information calculation section 74 is provided. The image information calculation section 74 includes an infrared filter 741, a lens 742, the imaging element 743 and an image processing circuit 744 located in this order from the front surface of the controller 7. These elements are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 via lines provided on the substrate 700 or the like, and outputs a sound signal to the speaker 706 via the amplifier 708 in accordance with the sound data transmitted from the game apparatus main body 5.

On the bottom main surface of the substrate 700, a vibrator 704 is attached. The vibrator 704 is, for example, a vibration motor or a solenoid. The vibrator 704 is connected to the microcomputer 751 via lines provided on the substrate 700 or the like, and turns the microcomputer 751 on or off in accordance with vibration data transmitted from the game apparatus main body 5. The controller 7 is vibrated by an actuation of the vibrator 704, and the vibration is conveyed to the player holding the controller 7. Thus, a so-called vibration-responsive game is realized. Since the vibrator 704 is provided slightly forward with respect to the center of the housing 71, the housing 71 held by the player is largely vibrated. Thus, the player easily senses the vibration.

Figure 7:
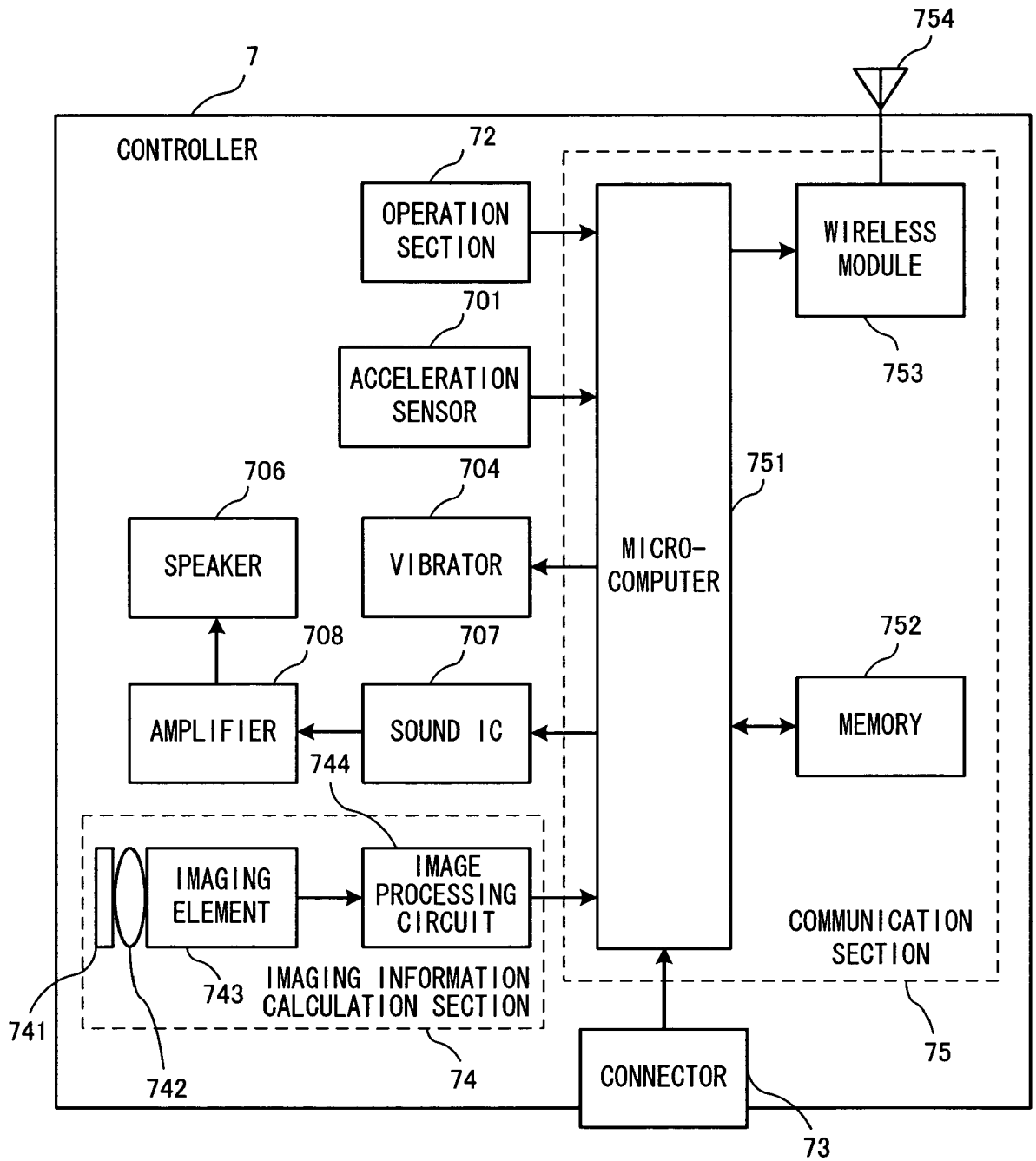
FIG. 7 is a block diagram illustrating a structure of the controller 7.

With respect to FIG. 7, the internal structure of the controller 7 will be described. FIG. 7 is a block diagram showing the structure of the controller 7.

As shown in FIG. 7, the controller 7 includes a communication section 75 therein in addition to the operation section 72, the imaging information calculation section 74, the acceleration sensor 701, the vibrator 704, the speaker 706, the sound IC 707 and the amplifier 708 described above.

The imaging information calculation section 74 includes the infrared filter 741, the lens 742, the imaging element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the imaging element 743. The imaging element 743 is a solid-state imaging device such as, for example, a CMOS sensor or a CCD. The imaging element 743 takes an image of the infrared light collected by the lens 742. Accordingly, the imaging element 743 takes an image of only the infrared light which has passed through the infrared filter 741 for generating image data. The image data generated by the imaging element 743 is processed by the image processing circuit 744. Specifically, the image processing circuit 744 processes the image data obtained from the imaging element 743, senses an area thereof having a high brightness, and outputs the processing result data representing the detected position and size of the area to the communication section 75. The imaging information calculation section 74 is fixed to the housing 71 of the controller 7. The imaging direction of the imaging information calculation section 74 can be changed by changing the direction of the housing 71.

The acceleration sensor 701 included in the controller 7 is preferably a three-axial (x, y and z axes) acceleration sensor. The three-axial acceleration sensor 701 detects a linear acceleration in each of three directions, i.e., an up-down direction (Y-axis direction shown in FIG. 3), a left-right direction (X-axis direction shown in FIG. 3), and a front-rear direction (Z-axis direction shown in FIG. 3). In another embodiment, two-axial acceleration detection means for detecting a linear acceleration in each of only X-axis and Y-axis directions (or directions along another pair of axes) may be used depending on the type of control signals used for game processing. In still another embodiment, one-axial acceleration detection means for detecting a linear acceleration in only one of X-, Y-, and Z-axis directions may be used depending on the type of control signals used for game processing. For example, such a three-axial, two-axial or one-axial acceleration sensor 701 may be available from Analog Devices, Inc. or STMicroelectronics N.V. The acceleration sensor 701 is preferably of a static capacitance system (static capacitance coupling system) based on the technology of MEMS (Micro Electro Mechanical Systems) provided by silicon precision processing. Alternatively, the three-axial, two-axial or one-axial acceleration sensor 701 may be based on an existing acceleration detection technology (e.g., piezoelectric system or piezoelectric resistance system) or any other appropriate technology developed in the future.

The acceleration detection means used for the acceleration sensor 701 can detect only an acceleration along a straight line corresponding to each of the axes of the acceleration sensor 701 (linear acceleration). Namely, a direct output from the acceleration sensor 701 is a signal indicating the linear acceleration (static or dynamic) along each of one, two or three axes thereof. Hence, the acceleration sensor 701 cannot directly detect a physical property such as, for example, a motion along a nonlinear path (e.g., an arc path), rotation, revolution, angular displacement, inclination, position or posture.

Nonetheless, those skilled in the art would easily understand from the description of this specification that further information on the controller 7 can be estimated or calculated (determined) by executing additional processing on an acceleration signal which is output from the acceleration sensor 701. For example, when a static acceleration (gravitational acceleration) is detected, an inclination of the target (controller 7) with respect to the gravitational vector can be determined by performing calculations based on the inclination angle and the detected acceleration, using the output from the acceleration sensor 701. By combining the acceleration sensor 701 with the microcomputer 751 (or another processor included in the game apparatus main body 5, such as the CPU 30 or the like) in this manner, the inclination, posture or position of the controller 7 can be determined. Similarly, when the controller 7 including the acceleration sensor 701 is dynamically accelerated by a hand of the player, various motions and/or positions of the controller 7 can be calculated by processing an acceleration signal generated by the acceleration sensor 701. In another embodiment, the acceleration sensor 701 may include a built-in signal processing device, or another type of dedicated processing device, for executing desired processing on an acceleration signal which is output from the built-in acceleration detection means, before the signal is output to the microcomputer 751. For example, when the acceleration sensor 701 is for detecting a static acceleration (e.g., a gravitational acceleration), the built-in or dedicated processing device may convert the detected acceleration signal to a corresponding inclination angle (or another preferable parameter). The data indicating the acceleration detected by the acceleration sensor 701 is output to the communication section 75.

In another embodiment, a gyrosensor having a built-in rotation element or vibration element may be used as a motion sensor for detecting a motion of the controller 7. One exemplary MEMS gyrosensor usable in this embodiment is available from Analog Devices, Inc. Unlike the acceleration sensor 701, a gyrosensor can directly sense a rotation (or an angular rate) around an axis of at least one gyro element built therein. Since a gyrosensor and an acceleration sensor are fundamentally different from each other, either sensor may be selected in accordance with the use. An output signal from the selected sensor needs to be processed in a manner appropriate to the selected sensor.

Specifically, when a gyrosensor is used for calculating an inclination or a posture, instead of an acceleration sensor, significant changes are made. More specifically, when a gyrosensor is used, an inclination value is initialized before the detection is started. The angular rate data which is output from the gyrosensor is integrated. Next, an inclination change amount is calculated from the initialized inclination value. In this case, the calculated inclination corresponds to the angle. By contrast, when an acceleration sensor is used, the inclination is calculated by comparing the value of a gravitational acceleration component of each axis with a predetermined reference value. Therefore, the calculated inclination can be represented with a vector. Even without initialization, an absolute direction detected by the acceleration detection means can be obtained. As for the nature of the value calculated as an inclination, the value calculated using a gyrosensor is an angle whereas the value calculated using an acceleration sensor is a vector. Therefore, when a gyrosensor is used instead of an acceleration sensor, the inclination data needs to be converted as predetermined in consideration of the differences between the two devices. The characteristics of a gyrosensor are known to those skilled in the art as well as the basic differences between two devices, and will not be further described in this specification. A gyrosensor is advantageous in directly sensing a rotation, whereas an acceleration sensor is advantageous in generally having a higher cost efficiency when applied to a controller as used in this embodiment.

The communication section 75 includes the microcomputer 751, a memory 752, the wireless module 753, and the antenna 754. The microcomputer 751 controls the wireless module 753 for wirelessly transmitting the transmission data, while using the memory 752 as a storage area during processing. The microcomputer 751 also controls the operation of the sound IC 707 and the vibrator 704 in accordance with the data transmitted from the game apparatus main body 5 to the wireless module 753 via the antenna 754. The sound IC 707 processes sound data or the like transmitted from the game apparatus main body 5 via the communication section 75. The microcomputer 751 actuates the vibrator 704 in accordance with, for example, the vibration data (e.g., a signal for turning the vibrator 704 on or off) transmitted from the game apparatus main body 5 via the communication section 75.

Data from the controller 7 including an operation signal (key data) from the operation section 72, acceleration signals in the three axial directions (X-axis, Y-axis and Z-axis direction acceleration data) from the acceleration sensor 701, and the processing result data from the imaging information calculation section 74 are output to the microcomputer 751. The microcomputer 751 temporarily stores the input data (key data, acceleration data, and the processing result data) in the memory 752 as transmission data which is to be transmitted to the communication unit 6. The wireless transmission from the communication section 75 to the communication unit 6 is performed at a predetermined time interval. Since game processing is generally performed at a cycle of 1/60 sec., the wireless transmission needs to be performed at a cycle of a shorter time period. Specifically, the game processing unit is 16.7 ms (1/60 sec.), and the transmission interval of the communication section 75 structured using the Bluetooth (registered trademark) technology is, for example, 5 ms. At the transmission timing to the communication unit 6, the microcomputer 751 outputs the transmission data stored in the memory 752 as a series of operation information to the wireless module 753. Based on the Bluetooth (registered trademark) technology or the like, the wireless module 753 uses a carrier wave of a predetermined frequency to convert the operation information and radiate the carrier wave signal from the antenna 754. Namely, the key data from the operation section 72, the X-axis, Y-axis and Z-axis direction acceleration data from the acceleration sensor 701, and the processing result data from the imaging information calculation section 74 are transmitted from the controller 7. The communication unit 6 of the game apparatus main body 5 receives the carrier wave signal, and the game apparatus main body 5 demodulates or decodes the carrier wave signal to obtain the series of operation information (the key data, the X-axis, Y-axis and Z-axis direction acceleration data, and the processing result data) Based on the obtained operation information and the game program, the CPU 30 of the game apparatus main body 5 performs the game processing. In the case where the communication section 75 is structured using the Bluetooth (registered trademark) technology, the communication section 75 can have a function of receiving transmission data which is wirelessly transmitted from other devices.

Before describing specific processing executed by the game apparatus main body 5, an overview of a game playable by the game apparatus main body 5 will be described. In this embodiment, a baseball game will be played by a player. The present example embodiments are applicable to games other than the baseball game.

Figure 8:
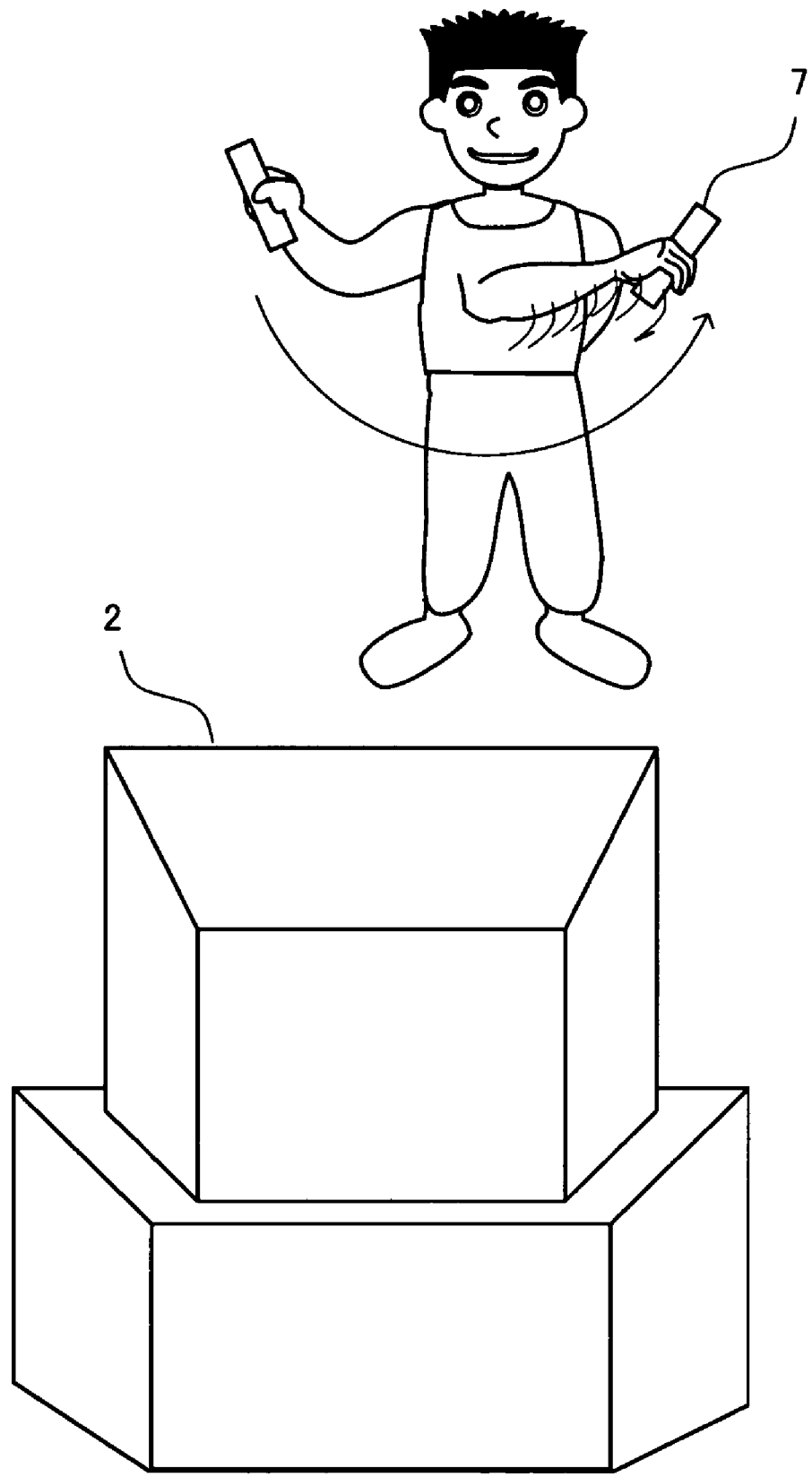
FIG. 8 shows a swing operation of the user.

As shown in FIG. 8, the controller 7 has an overall size which can be held by one hand of an adult or even a child. The player swings the controller 7 as if he/she swung a baseball bat, so as to cause a character (batter) in the virtual three-dimensional space to swing a bat. In the following description, the operation of swinging the controller 7 will be referred to as a "swing operation".

Figure 9:
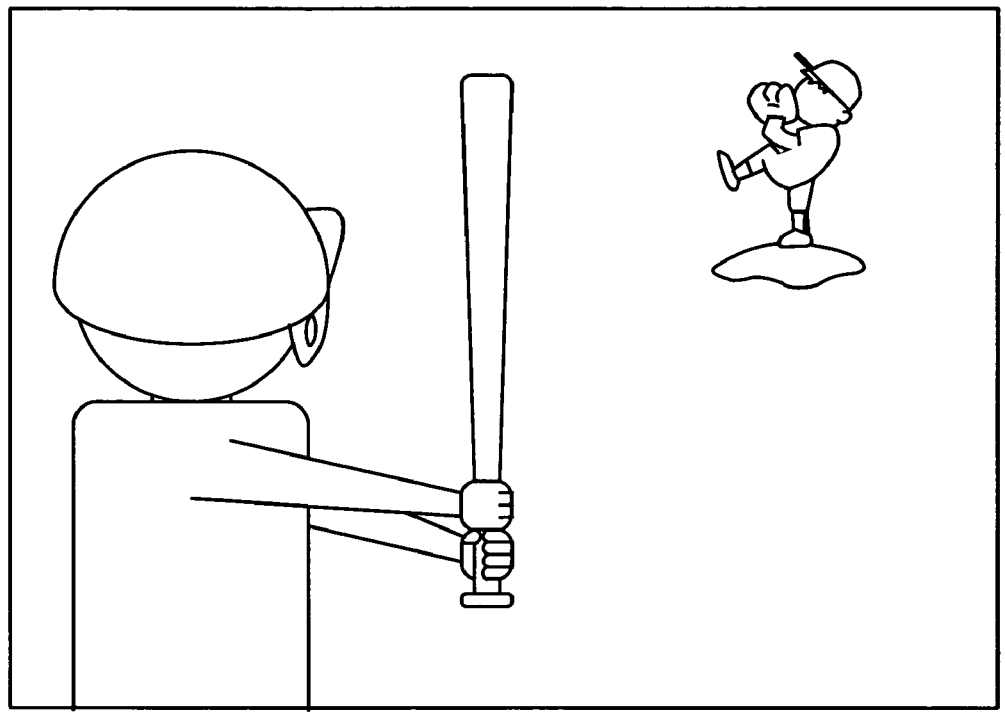
FIG. 9 shows an exemplary game image displayed on a screen of a monitor 2.

FIG. 9 shows an exemplary game image displayed on the screen of the monitor 2 when a pitcher is about to throw a ball in the virtual three-dimensional space. After this, the pitcher throws the ball. If the player performs a swing operation at a good timing when the ball thrown by the pitcher passes by the batter, the batter hits the ball with the bat. The ball hit by the batter flies above a field in the virtual three-dimensional space while drawing a parabola.

Figure 10:
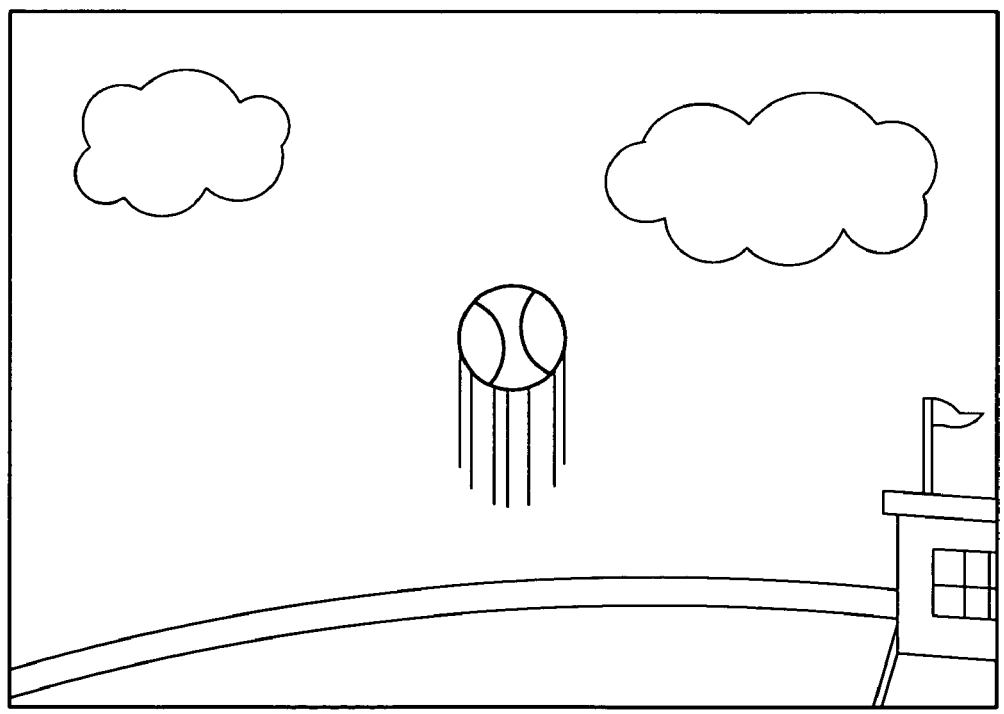
FIG. 10 shows an exemplary game image displayed on the screen of the monitor 2.

FIG. 10 shows an exemplary game image displayed on the screen of the monitor 2 when the ball is rising (i.e., moving in the direction opposite to the direction of gravity acting on the ball). While the ball is rising, the ball is displayed at a central position of the screen. Therefore, background elements such as audience seats, clouds and the like rapidly move downward in the screen, which provides a powerful image.

Figure 11:
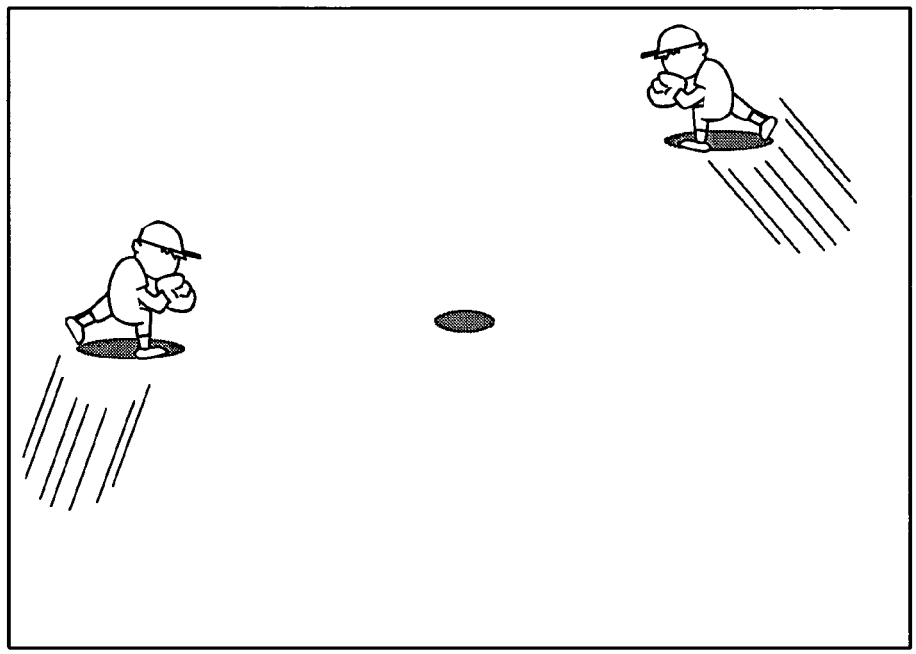
FIG. 11 shows an exemplary game image displayed on the screen of the monitor 2.

FIG. 11 shows an exemplary game image displayed on the screen of the monitor 2 when the ball is falling (i.e., moving in the same direction as that of the gravity acting on the ball). While the ball is falling, the shadow of the ball, not the ball itself, is displayed at a central position of the screen (it should be noted that the shadow of the ball is displayed at an intersection of the vertical straight line passing through the ball and the field). Therefore, the player can grasp, from the game image, a point right below the ball, a point where the ball is to fall, and the like. As a result, the player can check, on the screen, the motion of fielders running toward the point where the ball is to fall, whether the ball is flying outside or inside the foul line, and the like.

The game images as shown in FIG. 9 through FIG. 12 are generated by perspective and projection conversion processing based on a virtual camera which is set in the virtual three-dimensional space. Especially for generating the game images in FIG. 10 and FIG. 11, the virtual camera needs to be controlled in accordance with the movement of the ball. Hereinafter, with reference to FIG. 12 through FIG. 15, a method for controlling the virtual camera in this embodiment will be described.

Figure 12:
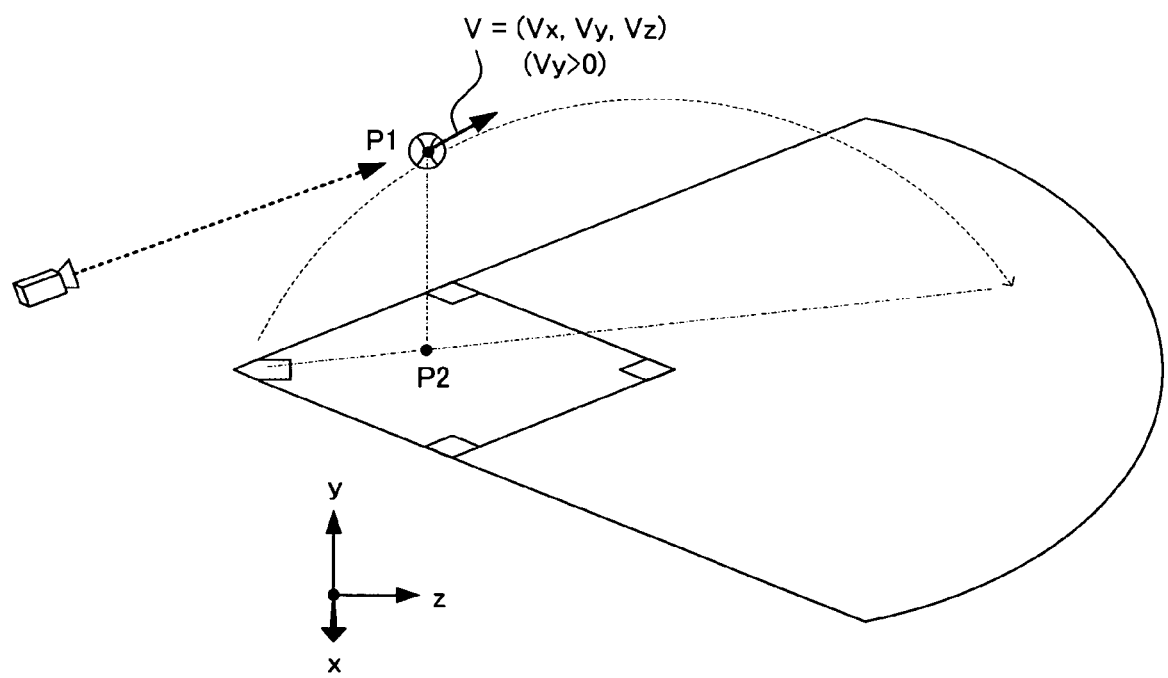
FIG. 12 shows a virtual camera while a ball is rising.

FIG. 12 shows the virtual camera while the ball is rising.

The position of the virtual camera in the virtual three-dimensional space is represented by a world coordinate system which uses three coordinate axes (a x axis, a y axis and a z axis) perpendicular to one another. In this embodiment, for example, the x axis represents a direction from the third base toward the first base, the y axis represents an upward vertical direction (i.e., the direction opposite to the gravity direction), and the z axis represents the direction from the home base to the second base. The virtual camera is set at different positions in accordance with the trajectory of the ball (for example, in accordance with the moving direction, the flying distance, or the uppermost height of the ball). In the example shown in FIG. 12 through FIG. 14, the virtual camera is set behind the home base (i.e., at or in the vicinity of the backstop).

While the ball is rising as shown in FIG. 12, the point of attention of the virtual camera is set at the current position of the ball. Where the velocity of the ball is represented by the velocity vector V=(Vx, Vy, Vz) using the world coordinate system, "while the ball is rising" can also be represented as "while Vy is positive".

Figure 13:
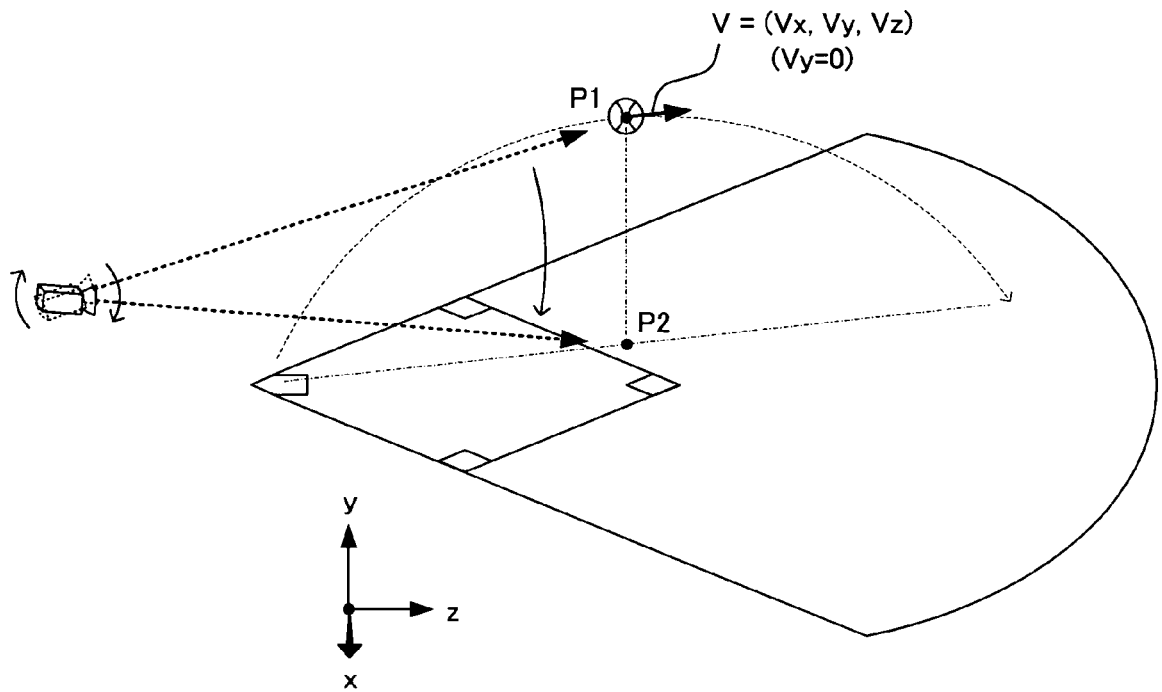
FIG. 13 shows the virtual camera at the instant when the movement of the ball is changed from rising to falling.

FIG. 13 shows the virtual camera at the instant when the movement of the ball is changed from rising to falling (i.e., the instant when Vy is 0). When the movement of the ball is changed from rising to falling, the point of attention of the virtual camera is moved from the position of the ball to the position of the shadow of the ball. At this time, the point of attention of the virtual camera may be instantly moved from the current position of the ball to the position of the shadow of the ball, or may be gradually moved away from the current position of the ball and closer to the position of the shadow of the ball.

Figure 14:
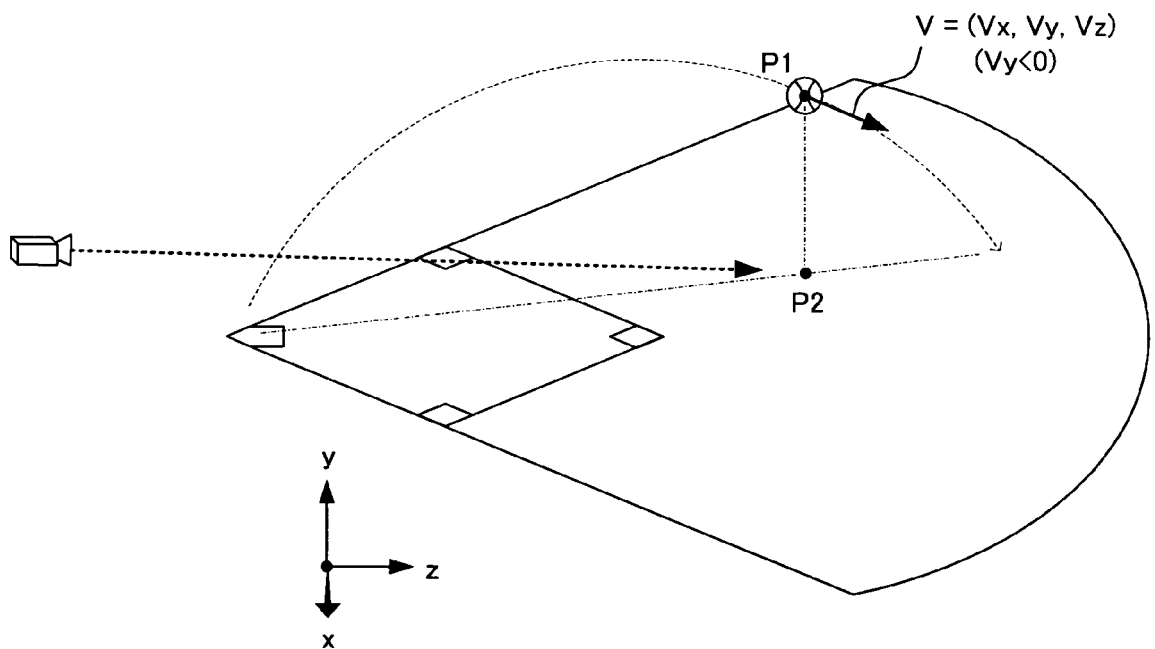
FIG. 14 shows the virtual camera while the ball is falling.

FIG. 14 shows the virtual camera while the ball is falling. While the ball is falling (i.e., while Vy is negative), the point of attention of the virtual camera is the position of the shadow of the ball.

Figure 15:
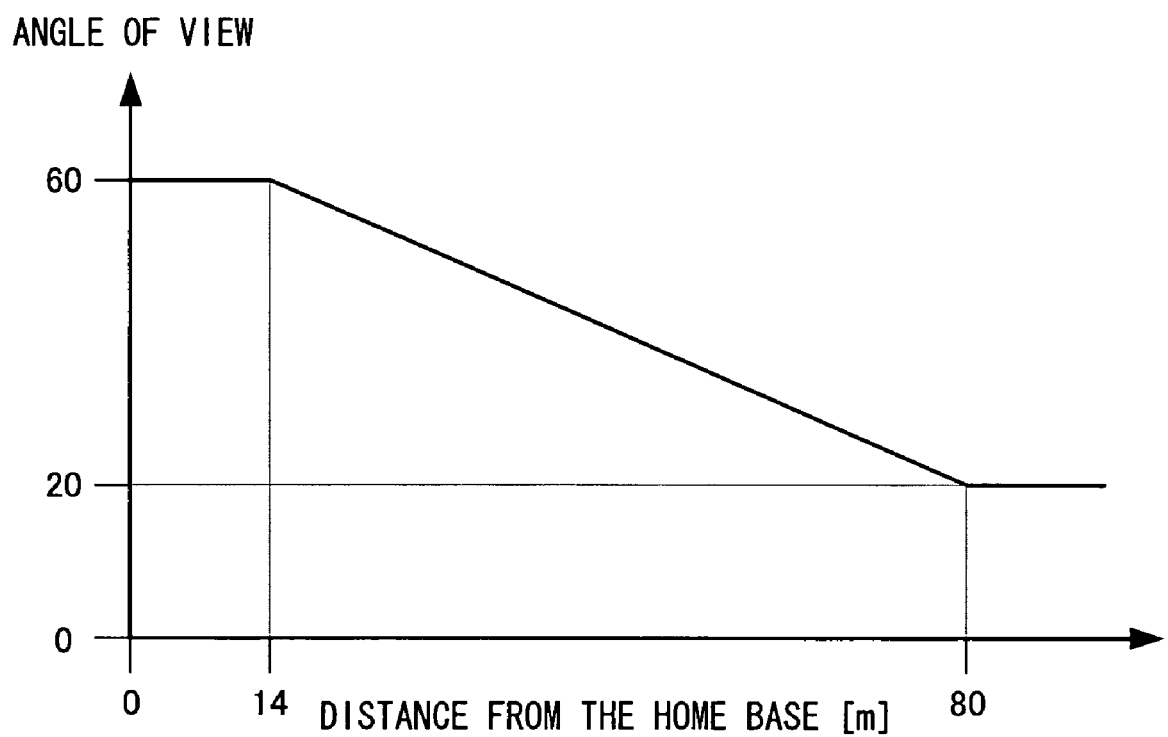
FIG. 15 shows the relationship between the distance from the home base to the ball and the angle of view of the virtual camera.

In addition to being controlled regarding the point of attention, the virtual camera is also controlled regarding the imaging angle as the ball moves. FIG. 15 shows the relationship between the distance from the home base to the ball and the angle of view of the virtual camera. As shown in FIG. 15, while the distance from the home base to the ball is 14 meters to 18 meters, as the distance becomes longer, the angle of view becomes smaller. In other words, as the ball becomes farther from the home base, the magnification of the virtual camera becomes higher. Therefore, even when the ball becomes farther from the virtual camera, the ball is not displayed to be smaller on the screen. Thus, a powerful image is displayed.

In general, as the angle of view of the virtual camera becomes smaller (i.e., the magnification of the virtual camera becomes higher), the image displayed on the screen becomes more powerful. However, since the field of view becomes smaller, the amount of information displayed on the screen decreases. In this embodiment, at the point where the movement of the ball is changed from rising to falling, the point of attention of the virtual camera is changed from the current position of the ball to the position of the shadow of the ball. Therefore, even though the angle of view of the virtual camera is decreased in order to obtain a powerful image, the player can grasp the point right below the ball, the point where the ball is to fall, and the like.

Hereinafter, an operation of the game apparatus 3 for realizing the above-described control on the virtual camera will be described in detail.

Figure 16:
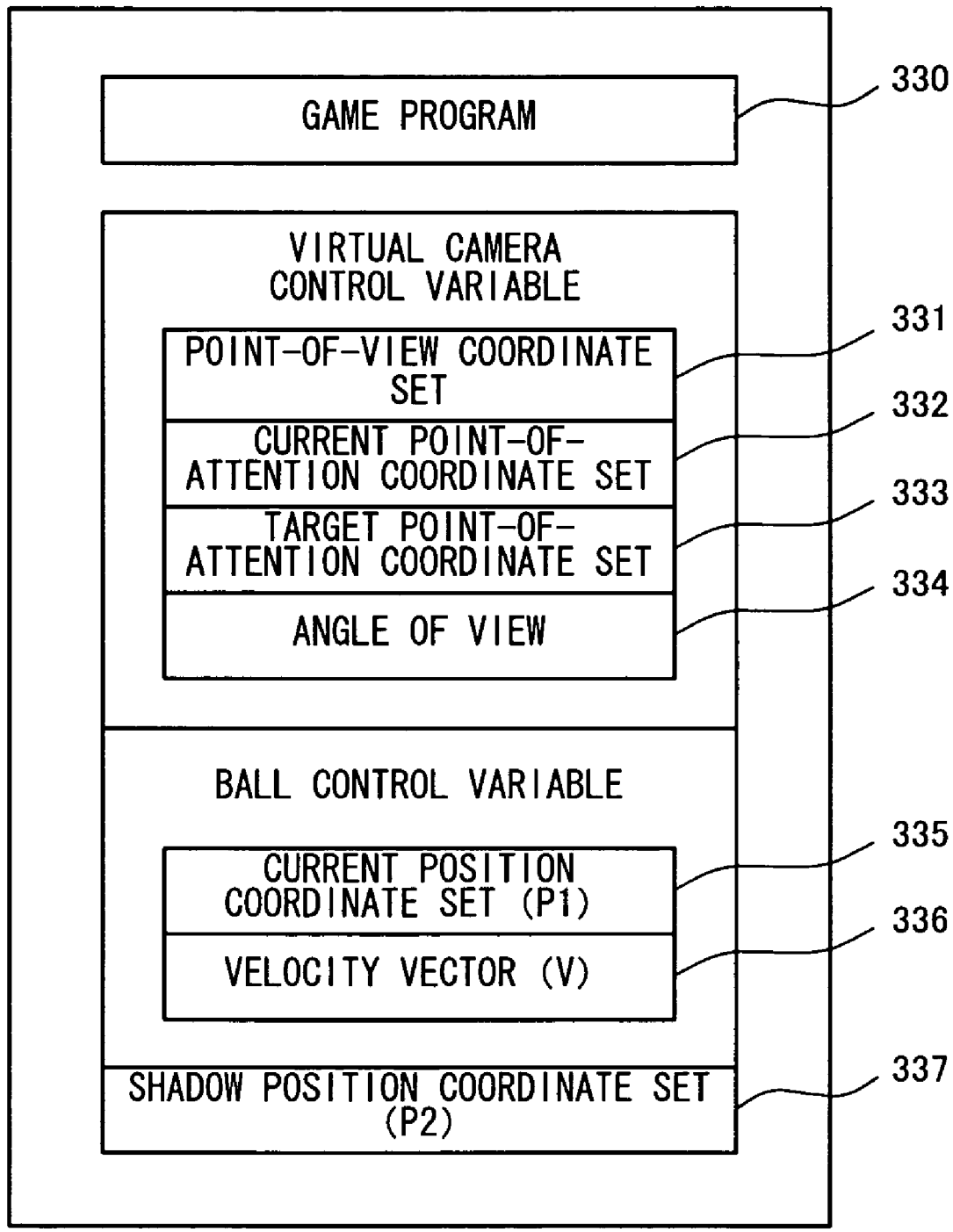
FIG. 16 is a memory map of a main memory 33.

FIG. 16 is an exemplary memory map of the main memory 33 of the game apparatus main body 5. The main memory 33 stores a game program 330, virtual camera control variables, ball control variables, and a shadow position coordinate set 337. The game program 330 is loaded from the optical disc 4 onto the main memory 33 before the game is started. The virtual camera control variables, ball control variables, and the shadow position coordinate set 337 are updated when necessary by the CPU 30 while the game processing is executed based on the game program 330.

The virtual camera control variables include a point-of-view coordinate set 331, a current point-of-attention coordinate set 332, a target point-of-attention coordinate set 333, and an angle of view 334. The point-of-view coordinate set 331 is a three-dimensional coordinate set representing the position of the virtual camera in the virtual three-dimensional space. The current point-of-attention coordinate set 332 is a three-dimensional coordinate set representing the current position of the point of attention of the virtual camera. The target point-of-attention coordinate set 333 is a three-dimensional coordinate set representing the position of the target position of the point of attention of the virtual camera. The target point-of-attention coordinate set 333 is merely referred to for updating the current point-of-attention coordinate set 332. For drawing actual game images, the current point-of-attention coordinate set 332 is used. The angle of view 334 represents the angle of view of the virtual camera.

The ball control variables include a current position coordinate set 335 and a velocity vector 336. The current position coordinate set 335 is a three-dimensional coordinate set representing the current position of the ball in the virtual three-dimensional space. The velocity vector 336 is a three-dimensional vector representing the moving velocity (including the magnitude and the direction) of the ball.

The shadow position coordinate set 337 is a three-dimensional coordinate set of the shadow of the ball in the virtual three-dimensional space (more precisely, an intersection of the vertical straight line passing through the ball and the field)

Figure 17:
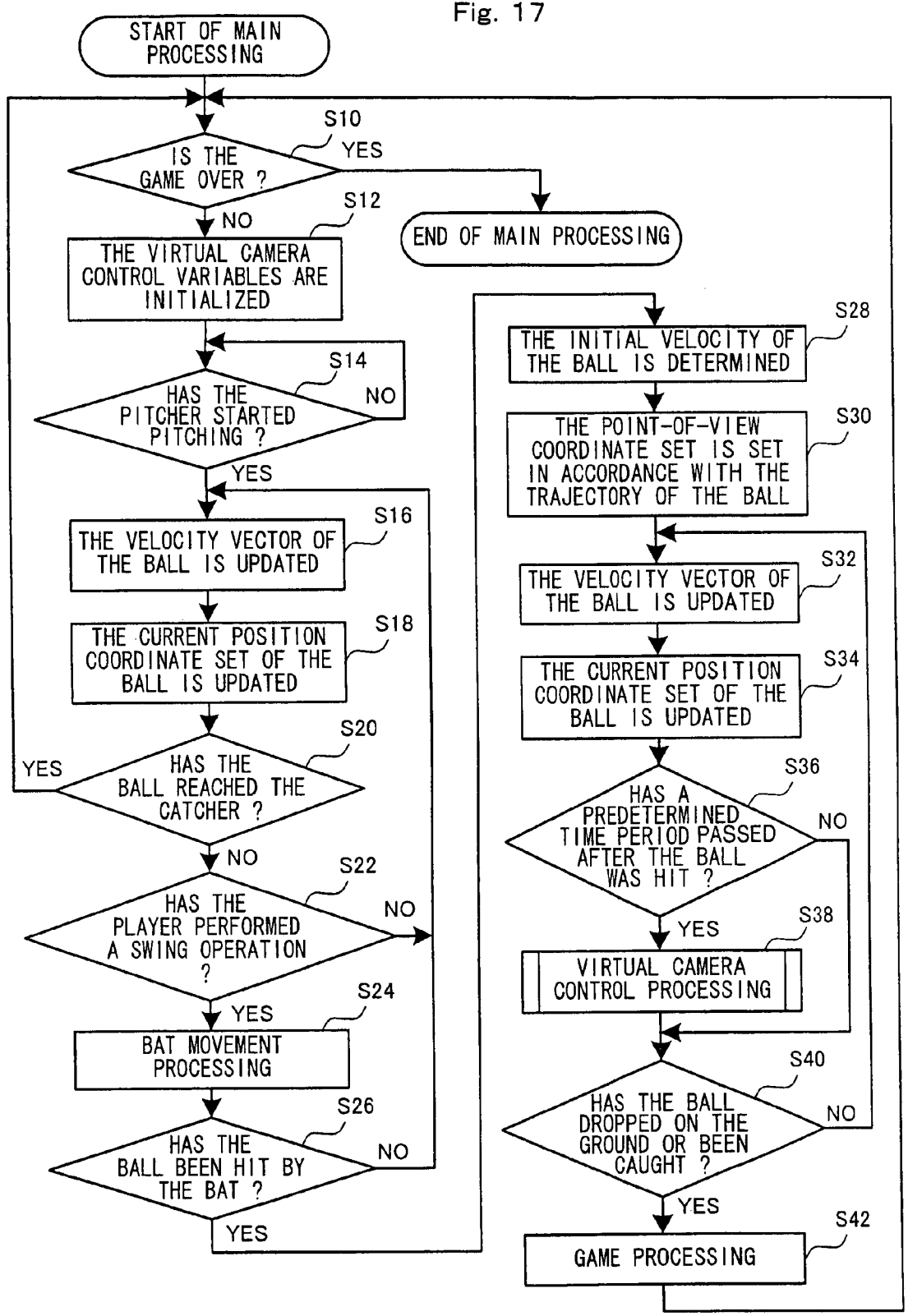
FIG. 17 is a flowchart illustrating an operation of a CPU 30 based on a game program 330.
Figure 18:
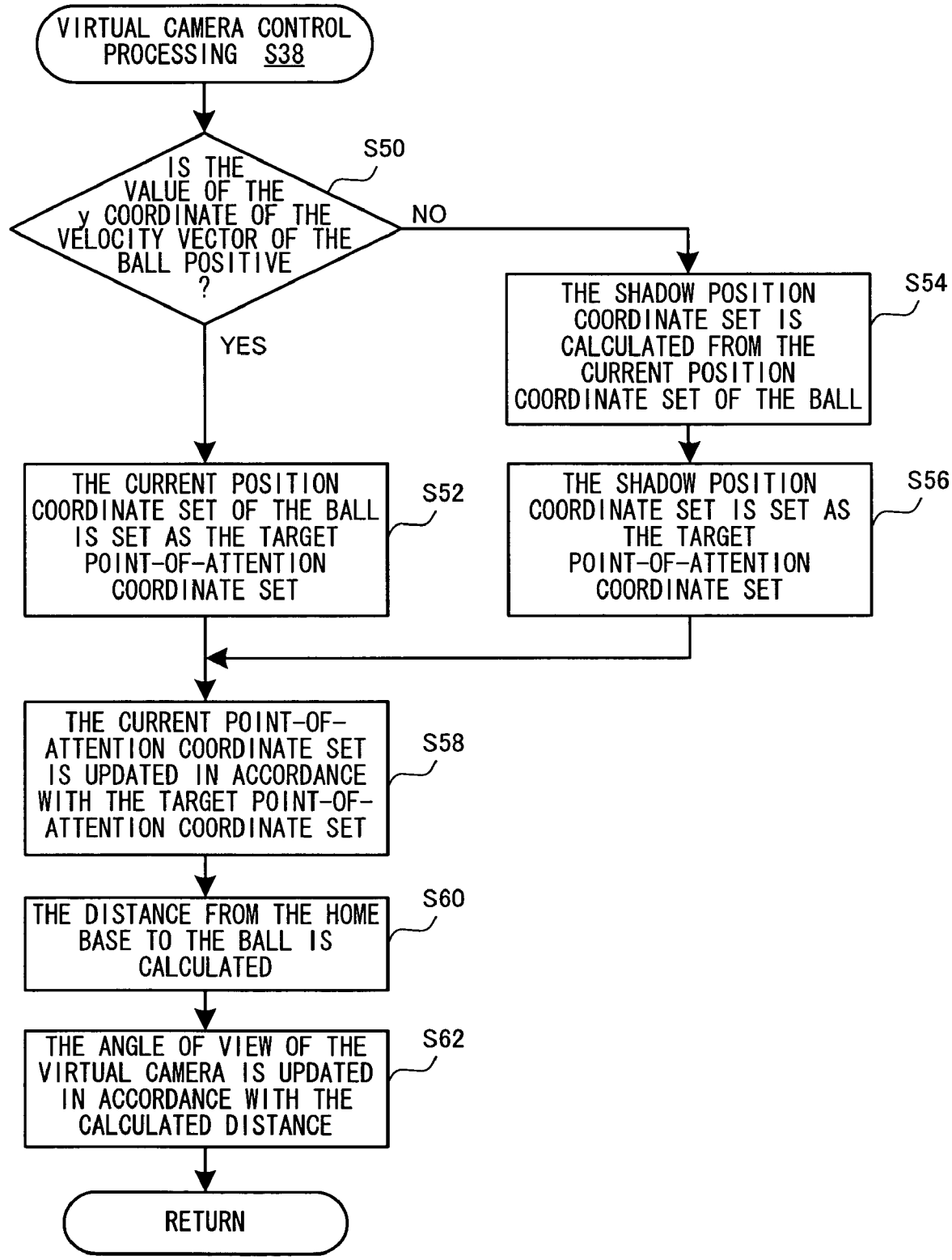
FIG. 18 is a flowchart illustrating virtual camera control processing in detail.

Next, with reference to the flowcharts in FIG. 17 and FIG. 18, an operation of the CPU 30 based on the game program 330 will be described. In FIG. 17, the processing of drawing a game image (perspective and projection conversion processing based on the virtual camera) is omitted for the sake of simplicity. In actuality, the processing of drawing a game image is executed at a certain cycle (for example, every 16.7 msec.), and the game image displayed on the screen of the monitor 2 is updated.

Referring to FIG. 17, at the start of the main processing, the CPU 30 determines whether or not the game is over. When the game is over, the CPU 30 terminates the main processing. When the game is not over, the processing is advanced to step S12.

In step S12, the CPU 30 initializes the virtual camera control variables. Specifically, the CPU 30 sets the point-of-view coordinate set 331, the current point-of-attention coordinate set 332, the target point-of-attention coordinate set 333, and the angle of view 334 of the virtual camera, such that a game image as shown in FIG. 9 is generated.

In step S14, the CPU 30 determines whether or not the pitcher has started pitching based on, for example, the value of the timer. When the pitcher has started pitching, the processing is advanced to step S16.

In step S16, the CPU 30 updates the velocity vector 336 of the ball. Specifically, the velocity vector 336 of the ball is updated in accordance with the gravity, the resistance of the air, and the rotation direction of the ball (straight, curve, screwball, forkball, etc.).

In step S18, the CPU 30 updates the current position coordinate set 335 of the ball in accordance with the velocity vector 336 updated in step S16. The processing in step S18 is repeated at a certain cycle, so that an animation of the ball moving from the pitcher toward the catcher is displayed.

In step S20, the CPU 30 refers to the current position coordinate set 335 of the ball to determine whether or not the ball has reached the catcher. When the ball has reached the catcher, the processing is returned to step S10. When the ball has not reached the catcher, the processing is advanced to step S22.

In step S22, the CPU 30 determines whether or not the player has performed a swing operation based on the operation information transmitted from the controller 7 and received by the communication unit 6. When the swing operation has been performed, the processing is advanced to step S24. When the swing operation has not been performed, the processing is returned to step S16.

In step S24, the CPU 30 updates the position of the bat held by the batter. The processing in step S24 is repeated at a certain cycle, so that an animation of the batter swinging the bat is displayed.

In step S26, the CPU 30 determines whether or not the ball has been hit by the bat based on the current position coordinate set 335 of the ball and the current position of the bat. When the ball has been hit by the bat, the processing is advanced to step S28. When the ball has not been hit by the bat, the processing is returned to step S16.

In step S28, the CPU 30 determines the initial velocity (the magnitude and the direction) of the ball, and updates the velocity vector 336 of the ball in accordance with the determined initial velocity.

In step S30, the CPU 30 calculates the trajectory of the ball based on the initial velocity determined in step S28, and determines the point-of-view coordinate set 331 of the virtual camera in accordance with the calculated trajectory. For example, when the trajectory of the ball is toward the right field, the point-of-view coordinate set 331 is set in or in the vicinity of the first base-side seats. When the trajectory of the ball is toward the center field, the point-of-view coordinate set 331 is set in or in the vicinity of the seats behind the center field. When the trajectory of the ball is toward the left field, the point-of-view coordinate set 331 is set in or in the vicinity of the third base-side seats.

In step S32, the CPU 30 updates the velocity vector 336 of the ball. Specifically, the velocity vector 336 of the ball is updated in accordance with the gravity and the resistance of the air. The processing in step S32 is repeated at a constant cycle, so that the value of the y coordinate of the velocity vector 336 of the ball, i.e., Vy, gradually decreases by the influence of the gravity.

In step S34, the CPU 30 updates the current position coordinate set 335 of the ball in accordance with the velocity vector 336 updated in step S32. The processing in step S34 is repeated at a constant cycle, so that an animation of the ball moving generally along a parabola above the field is displayed.

In step S36, the CPU 30 determines whether or not a predetermined time period has passed since the ball was hit by the bat. When the predetermined time period has passed, the processing is advanced to step S38. When the predetermined time period has not passed, the processing is advanced to step S40. The determination in step S36 is made by referring to the value of the timer which starts counting from the instant when the ball is hit by the bat. The processing in step S36 is executed in order not to change the camera control variables for a certain time period after the ball is hit by the bat, so that the player can check, on the screen, the pitcher and the batter immediately after the ball is hit.

In step S38, the CPU 30 executes virtual camera control processing. Hereinafter, with reference to the flowchart in FIG. 18, the virtual camera control processing will be described in detail.

At the start of the virtual camera control processing, in step S50, the CPU 30 determines whether or not the value of the y coordinate of the velocity vector 336 of the ball is positive (i.e., whether or not the ball is rising). When the value of the y coordinate is positive, the processing is advanced to step S52. When the value of the y coordinate is not positive, the processing is advanced to step S54.

In step S52, the CPU 30 sets the current position coordinate set 335 of the ball as the target point-of-attention coordinate set 333. Then, the processing is advanced to step S58.

In step S54, the CPU 30 calculates the shadow position coordinate set 337 based on the current position coordinate set 335 of the ball.

In step S56, the CPU 30 sets the shadow position coordinate set 337 as the target point-of-attention coordinate set 333. Then, the processing is advanced to step S58.

In step S58, the CPU 30 updates the current point-of-attention coordinate set 332 based on the target point-of-attention coordinate set 333 updated in step S52 or S56. For example, where the pre-update current point-of-attention coordinate set 332 is T, the post-update current point-of-attention coordinate set 332 is T', and the current position coordinate set 335 of the ball is P, the post-update current point-of-attention coordinate set 332 may be calculated by the expression of T'=T+(P−T)×0.05. In this case, the current point-of-attention coordinate set 332 is made closer to the target point-of-attention coordinate set 333 at a speed in proportion to the distance between the current point-of-attention coordinate set 332 and the target point-of-attention coordinate set 333. In another embodiment, the current point-of-attention coordinate set 332 may be updated so as to be made closer to the target point-of-attention coordinate set 333 at a constant speed. In still another embodiment, the target point-of-attention coordinate set 333 may be repeatedly updated such that when the movement of the ball is changed from rising to falling, the target point-of-attention coordinate set 333 is gradually moved from the current position coordinate set 335 of the ball toward the shadow position coordinate set 337.

As described above, the current point-of-attention coordinate set 332 is gradually made closer to the target point-of-attention coordinate set 333, so that the player is not perplexed by a rapid change of the direction of the virtual camera. The present example embodiments are not limited to this, and the point-of-attention of the virtual camera may be instantly moved to the current position coordinate set 335 of the ball or the shadow position coordinate set 337.

In step S60, the CPU 30 refers to the current position coordinate set 335 of the ball to calculate a distance between the home base and the current position of the ball.

In step S62, the CPU 30 updates the angle of view 334 of the virtual camera based on the distance calculated in step S60 and the relationship shown in FIG. 15. The angle of view 334 of the virtual camera may be processed in a similar manner to the point-of-attention described above. Namely, a current angle of view may be gradually made closer to a target angle of view. In this case, the player is not perplexed by a rapid change of the angle of view of the virtual camera.

When the virtual camera control processing is terminated, the processing is advanced to step S40 in FIG. 17.

In step S40, the CPU 30 determines whether or not the ball has dropped on the ground or been caught by the fielder based on the current position coordinate set 335 of the ball. When the ball has dropped on the ground or been caught by the fielder, the processing is advanced to step S42. When the ball has neither dropped on the ground nor been caught by the fielder, the processing is returned to step S32.

In step S42, the CPU 30 executes game processing after the ball drops on the ground or is caught by the fielder (for example, processing of causing the batter to run or the fielder to throw the ball). Then, the processing is returned to step S10.

As described above, according to this embodiment, while the ball is rising, the ball is displayed at a central position of the screen. Therefore, the background elements such as audience seats, clouds and the like rapidly move downward in the screen, which provides a powerful image. While the ball is falling, the shadow of the ball, not the ball itself, is displayed at a central position of the screen. Therefore, the player can grasp, from the game image, a point right below the ball, a point where the ball is to fall, and the like. Especially because the above-described movement of the point of attention of the virtual camera is the same as the movement of the line of sight of a general observer in an actual ballpark, the player can obtain a realistic feeling as if he/she was actually in the virtual three-dimensional space.

In this embodiment, at the instant when the movement of the ball is changed from rising to falling, the point of attention of the virtual camera is moved from the current position of the ball to the position of the shadow of the ball. Therefore, the point of attention of the virtual camera is moved always at an appropriate timing. This will be described in more detail. For example, in the case where the virtual camera is controlled such that the point of attention of the virtual camera is moved from the current position of the ball to the position of the shadow of the ball a certain time period after the ball is hit by the bat, if the ball stays in the air for a long time, the point of attention of the virtual camera is moved too early with respect to the appropriate timing. If the ball stays in the air for a short time, the point of attention of the virtual camera is moved too late with respect to the appropriate timing. According to the control method on the virtual camera in this embodiment, the point of attention of the virtual camera is moved based on the velocity of the ball (especially, the component of the gravity direction), the point of attention of the virtual camera is moved always at an appropriate timing regardless of how long the ball stays in the air.

In this embodiment, the point of attention of the virtual camera is moved from the current position of the ball to the position of the shadow of the ball at the instant when the movement of the ball is changed from rising to falling (i.e., at the instant when the value of the y coordinate of the velocity vector 336 of the ball becomes 0). The present example embodiment is not limited to this. For example, the point of attention of the virtual camera may be moved from the current position of the ball to the position of the shadow of the ball at the instant when the value of the y coordinate of the velocity vector 336 of the ball becomes a predetermined value other than 0 (e.g., −5). Alternatively, the magnitude of the velocity vector 336 of the ball (i.e., $\sqrt{(Vx^2+Vy^2+Vz^2)}$) may be monitored, and the point of attention of the virtual camera may be moved from the current position of the ball to the position of the shadow of the ball at the instant when the magnitude of the velocity vector 336, which has been decreasing, starts increasing.

Figure 19:
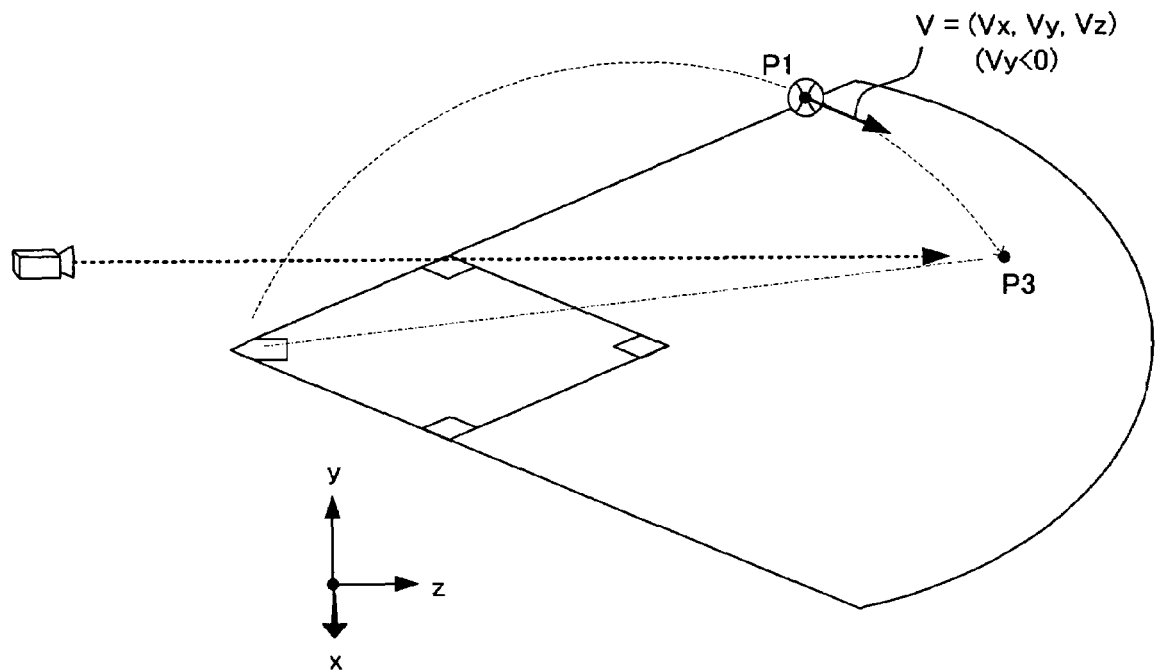
FIG. 19 shows the virtual camera while the ball is falling according to a modification of the embodiment.
Figure 20:
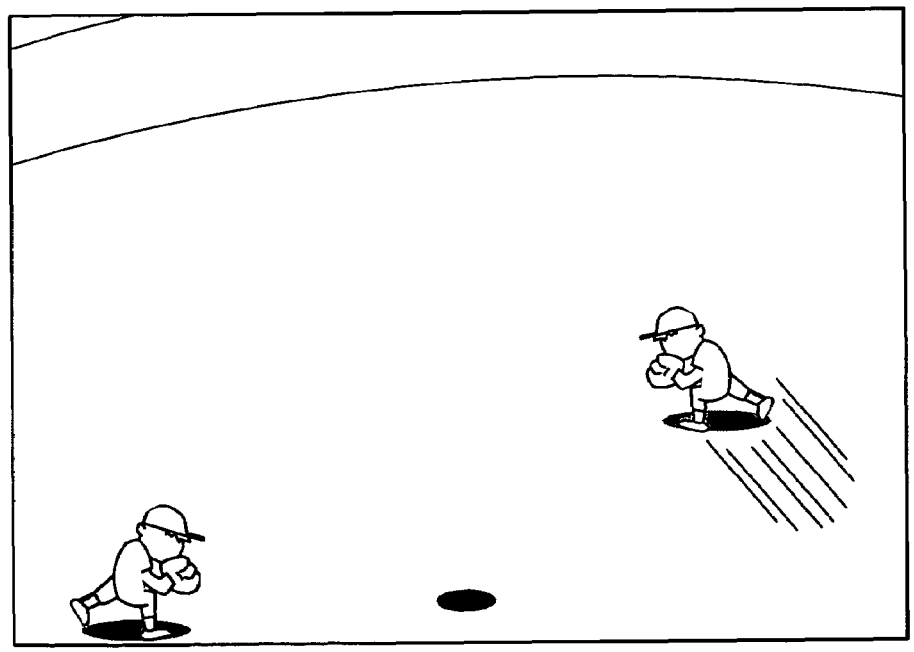
FIG. 20 shows an exemplary game image displayed on the screen of the monitor 2 according to the modification.

In this embodiment, while the ball is falling, the point of attention of the virtual camera is set at the position of the shadow of the ball (P2 in FIG. 14). The present example embodiment is not limited to this. In one modification, as shown in FIG. 19, while the ball is falling, the point of attention of the virtual camera may be set at a point P3 where the ball is to fall. FIG. 20 shows an exemplary game image displayed on the screen of the monitor 2 while the ball is falling in this modification. In this modification also, the player can confirm that the ball is energetically rising with a powerful game image, and also can grasp, on the screen, a point right below the ball, a point where the ball is to fall, and the like. In another modification, while the ball is falling, the point of attention of the virtual camera may be set at an intermediate position between the position of the shadow of the ball (P2 in FIG. 14) and the point where the ball is to fall (P3 in FIG. 19).

In this embodiment, an image representing the ball moving above the field is generated. The present example embodiment is not limited to this, and is applicable for generating an image representing any object other than the ball moving above the field.

While the example embodiments has been described in detail, the foregoing description is in all aspects illustrative and not restrictive. It is understood that numerous other modifications and variations can be devised without departing from the scope of the invention.

What is claimed is:

1. A non-transitory computer readable storage medium having stored thereon a game program executable by a computer of a game apparatus for displaying, on a display screen, a game image representing a movable object moving above a field which is set in a virtual three-dimensional space, wherein the game program causes the computer to execute:

movement control including repeatedly updating position information representing a position of the movable object in the virtual three-dimensional space, such that the movable object moves generally along a parabola above the field;

determining whether or not a velocity of the movable object controlled in the movement control has fulfilled a specific condition, said determining occurring after the moveable object has already begun its movement along the parabola above the field and occurring during the movement of the moveable object along the parabola;

point of attention control including, when the velocity of the movable object has not fulfilled the specific condition, setting a point of attention of a virtual camera at a current position of the movable object so that the point of attention moves so as to follow movement of the movable object, and when the velocity of the movable object has fulfilled the specific condition, moving the point of attention of the virtual camera from the current position of the movable object toward a specific point on the field; and generating a game image to be displayed on the display screen such that the point of attention of the virtual camera is controlled in the virtual three-dimensional space, the point of attention of the virtual camera being controlled so that the movable object is located at and remains at a specific position on the game image during the time that the velocity of the movable object has not fulfilled the specific condition.

2. The non-transitory computer readable storage medium according to claim 1, wherein the specific point is an intersection of a vertical straight line passing through the movable object and the field.

3. The non-transitory computer readable storage medium according to claim 1, wherein the specific point is a point where the movable object is to fall.

4. The non-transitory computer readable storage medium according to claim 1, wherein the specific point is an intermediate position between an intersection of a vertical straight line passing through the movable object and the field and a point where the movable object is to fall.

5. The non-transitory computer readable storage medium according to claim 1, wherein the specific condition is regarding a magnitude of the velocity of the movable object in the virtual three-dimensional space.

6. The non-transitory computer readable storage medium according to claim 1, wherein the specific condition is that a magnitude of the velocity of the movable object, which has been decreasing, starts increasing.

7. The non-transitory computer readable storage medium according to claim 1, wherein the specific condition is regarding a direction and/or a magnitude of a gravity-direction component of a velocity of the movable object in the virtual three-dimensional space.

8. The non-transitory computer readable storage medium according to claim 7, wherein the specific condition is that the direction of the gravity-direction component of the velocity of the movable object is inverted.

9. The non-transitory computer readable storage medium according to claim 1, wherein in the point of attention control, when the velocity of the movable object has fulfilled the specific condition, the point of attention of the virtual camera is repeatedly updated so as to be gradually away from the current position of the movable object and closer to the specific point.

10. The non-transitory computer readable storage medium according to claim 9, wherein in the point of attention control, the point of attention of the virtual camera is repeatedly updated so as to be gradually closer to the specific point at a speed in accordance with a distance between a current point of attention and the specific point.

11. The non-transitory computer readable storage medium according to claim 9, wherein in the point of attention control, the point of attention of the virtual camera is repeatedly updated so as to be gradually closer to the specific point at a constant speed.

12. The non-transitory computer readable storage medium according to claim 1, wherein determining whether or not the velocity of the moveable object controlled in the movement control has fulfilled the specific condition occurs after a predetermined time period has passed after the moveable object has begun its movement along the parabola.

13. The non-transitory computer readable storage medium according to claim 1, wherein the moveable object represents a ball, and said determining whether or not the velocity of the ball controlled in the movement control has fulfilled the specific condition occurs after the ball has been hit.

14. The non-transitory computer readable storage medium according to claim 13, wherein determining whether or not the velocity of the ball controlled in the movement control has fulfilled the specific condition is performed after a predetermined time period has passed after the ball has been hit.

15. The game apparatus for displaying, on a display screen, a game image representing a movable object moving above a field which is set in a virtual three-dimensional space, the game apparatus comprising:
a movement controller for repeatedly updating position information representing a position of the movable object in the virtual three-dimensional space, such that the movable object moves generally along a parabola above the field;
condition determination programmed logic circuitry for determining whether or not a velocity of the movable object controlled by the movement controller has fulfilled a specific condition, said determining occurring after the moveable object has already begun its movement along the parabola above the field and occurring during the movement of the moveable object along the parabola;
a point of attention controller for, when the velocity of the movable object has not fulfilled the specific condition, setting a point of attention of a virtual camera at a current position of the movable object so that the point of attention moves so as to follow movement of the movable object, and when the velocity of the movable object has fulfilled the specific condition, moving the point of attention of the virtual camera from the current position of the movable object toward a specific point on the field; and
an image generator for generating a game image to be displayed on the display screen such that the point of attention of the virtual camera is controlled by the point of attention controller in the virtual three-dimensional space, the point of attention of the virtual camera being controlled so that the movable object is located at and remains at a specific position on the game image during the time that the velocity of the movable object has not fulfilled the specific condition.

16. The game apparatus according to claim 15, wherein the specific point is an intersection of a vertical straight line passing through the movable object and the field.

17. The game apparatus according to claim 15, wherein the specific point is a point where the movable object is to fall.

18. The game apparatus according to claim 15, wherein the specific point is an intermediate position between an intersection of a vertical straight line passing through the movable object and the field and a point where the movable object is to fall.

19. The game apparatus according to claim 15, wherein the specific condition is regarding a magnitude of the velocity of the movable object in the virtual three-dimensional space.

20. The game apparatus according to claim 15, wherein the specific condition is that a magnitude of the velocity of the movable object, which has been decreasing, starts increasing.

21. The game apparatus according to claim 15, wherein the specific condition is regarding a direction and/or a magnitude of a gravity-direction component of a velocity of the movable object in the virtual three-dimensional space.

22. The game apparatus according to claim 21, wherein the specific condition is that the direction of the gravity-direction component of the velocity of the movable object is inverted.

23. The game apparatus according to claim 15, wherein when the velocity of the movable object has fulfilled the specific condition, the point of attention controller repeatedly updates the point of attention of the virtual camera such that the point of attention becomes gradually away from the current position of the movable object and closer to the specific point.

24. The game apparatus according to claim 23, wherein the point of attention controller repeatedly updates the point of attention of the virtual camera such that the point of attention becomes gradually closer to the specific point at a speed in accordance with a distance between a current point of attention and the specific point.

25. The game apparatus according to claim 23, wherein the point of attention controller repeatedly updates the point of attention of the virtual camera such that the point of attention becomes gradually closer to the specific point at a constant speed.

26. The game apparatus according to claim 15, wherein determining whether or not the velocity of the moveable object controlled in the movement control has fulfilled the specific condition occurs after a predetermined time period has passed after the moveable object has begun its movement along the parabola.

27. The game apparatus according to claim 15, wherein wherein the moveable object represents a ball, and said determining whether or not the velocity of the ball controlled in the movement control has fulfilled the specific condition occurs after the ball has been hit.

28. The game apparatus according to claim 27, wherein determining whether or not the velocity of the ball controlled in the movement control has fulfilled the specific condition is performed after a predetermined time period has passed after the ball has been hit.

29. A method of displaying, on a display screen, a game image representing a movable object moving above a field which is set in a virtual three-dimensional space, the method comprising the steps of:
movement control including repeatedly updating position information representing a position of the movable object in the virtual three-dimensional space, such that the movable object moves generally along a parabola above the field;
determining whether or not a velocity of the movable object controlled in the movement control has fulfilled a specific condition, said determining occurring after the movable object has already begun its movement along the parabola above the field and occurring during the movement of the movable object along the parabola;
point of attention control including, when the velocity of the movable object has not fulfilled the specific condition, setting a point of attention of a virtual camera at a current position of the movable object so that the point of attention moves so as to follow movement of the movable object, and when the velocity of the movable object has fulfilled the specific condition, moving the point of attention of the virtual camera from the current position of the movable object toward a specific point on the field; and
generating a game image to be displayed on the display screen such that the point of attention of the virtual camera is controlled in the virtual three-dimensional space, the point of attention of the virtual camera being controlled so that the movable object is located at and remains at a specific position on the game image during the time that the velocity of the movable object has not fulfilled the specific condition.

30. A game system for displaying, on a display screen, a game image representing a movable object moving above a field which is set in a virtual three-dimensional space, the game system comprising:
a movement controller for repeatedly updating position information representing a position of the movable object in the virtual three-dimensional space, such that the movable object moves generally along a parabola above the field;
condition determination programmed logic circuitry for determining whether or not a velocity of the movable object controlled by the movement controller has fulfilled a specific condition, said determining occurring after the movable object has already begun its movement along the parabola above the field and occurring during the movement of the movable object along the parabola;
a point of attention controller for, when the velocity of the movable object has not fulfilled the specific condition, setting a point of attention of a virtual camera at a current position of the movable object so that the point of attention moves so as to follow movement of the movable object, and when the velocity of the movable object has fulfilled the specific condition, moving the point of attention of the virtual camera from the current position of the movable object toward a specific point on the field; and
an image generator for generating a game image to be displayed on the display screen such that the point of attention of the virtual camera is controlled by the point of attention controller in the virtual three-dimensional space, the point of attention of the virtual camera being controlled so that the movable object is located at and remains at a specific position on the game image during the time that the velocity of the movable object has not fulfilled the specific condition.

* * * * *